(12) United States Patent
Choi et al.

(10) Patent No.: US 11,641,238 B2
(45) Date of Patent: May 2, 2023

(54) SIGNAL TRANSMISSION AND RECEPTION METHOD AND DEVICE IN WIRELESS COMMUNICATION SYSTEM

(71) Applicant: LG ELECTRONICS INC., Seoul (KR)

(72) Inventors: Kukheon Choi, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/424,480

(22) PCT Filed: Jan. 28, 2020

(86) PCT No.: PCT/KR2020/001251
§ 371 (c)(1),
(2) Date: Jul. 20, 2021

(87) PCT Pub. No.: WO2020/153827
PCT Pub. Date: Jul. 30, 2020

(65) Prior Publication Data
US 2022/0077927 A1 Mar. 10, 2022

(30) Foreign Application Priority Data
Jan. 25, 2019 (KR) .......... 10-2019-0009681

(51) Int. Cl.
*H04B 10/11* (2013.01)
*H04B 10/556* (2013.01)
(Continued)

(52) U.S. Cl.
CPC .......... *H04B 10/11* (2013.01); *H04B 10/556* (2013.01); *H04B 10/612* (2013.01); *H04L 5/001* (2013.01)

(58) Field of Classification Search
CPC .... H04B 10/11; H04B 10/556; H04B 10/612; H04B 2210/006; H04B 10/677; H04L 5/001; H04L 5/006; H04L 5/0094
(Continued)

(56) References Cited

U.S. PATENT DOCUMENTS

| 8,977,133 | B2 * | 3/2015 | Schmidt ............ | H04B 10/2575 398/118 |
| 2010/0034537 | A1 * | 2/2010 | Zhang ................ | H04B 10/5053 398/65 |

(Continued)

FOREIGN PATENT DOCUMENTS

| CA | 2399525 C | * | 9/2010 | ......... H04B 7/18582 |
| CN | 103517211 A | * | 1/2014 | ........... H04L 5/0053 |

(Continued)

OTHER PUBLICATIONS

Shintaro Hisatake et al., "Visualization of the spatial-temporal evolution of continuous electromagnetic waves in the terahertz range based on photonics technology", Optica vol. 1, Issue 6, pp. 365-371, Dec. 2014, See section 2.

*Primary Examiner* — Abbas H Alagheband
(74) *Attorney, Agent, or Firm* — Dentons US LLP

(57) ABSTRACT

Disclosed are a signal transmission and reception method and device in a wireless communication system. A method for receiving a signal by a terminal in a wireless communication system according to an embodiment of the present specification comprises the steps of: receiving configuration relating to a signal which is down-converted in frequency on the basis of an O/E converter; and receiving the signal in a particular resource region on the basis of the configuration. A frequency domain of the particular resource region comprises a plurality of chunks. The chunks comprise at least one component carrier (CC). The configuration comprises information indicating a main chunk relating to differential (Continued)

phase shift keying (DPSK). The transmission of the signal is on the basis of the DPSK applied between the chunks in the frequency domain with respect to the main chunk.

14 Claims, 29 Drawing Sheets

(51) Int. Cl.
*H04B 10/61* (2013.01)
*H04L 5/00* (2006.01)

(58) Field of Classification Search
USPC .......................................... 398/118
See application file for complete search history.

(56) References Cited

U.S. PATENT DOCUMENTS

| | | | |
|---|---|---|---|
| 2013/0236187 A1* | 9/2013 | Middleton | H04B 10/00 398/116 |
| 2015/0304065 A1* | 10/2015 | Werner | H04L 5/0046 398/58 |
| 2017/0318561 A1* | 11/2017 | Harel | H04W 72/0493 |
| 2019/0239230 A1* | 8/2019 | Harel | H04W 88/085 |

FOREIGN PATENT DOCUMENTS

| | | | | |
|---|---|---|---|---|
| EP | 1944893 A1 * | 7/2008 | | H04B 7/0452 |
| JP | 2004229180 A * | 8/2004 | | H04B 10/25754 |
| KR | 10-2016-0035549 A | 3/2016 | | |

* cited by examiner

[FIG. 1]
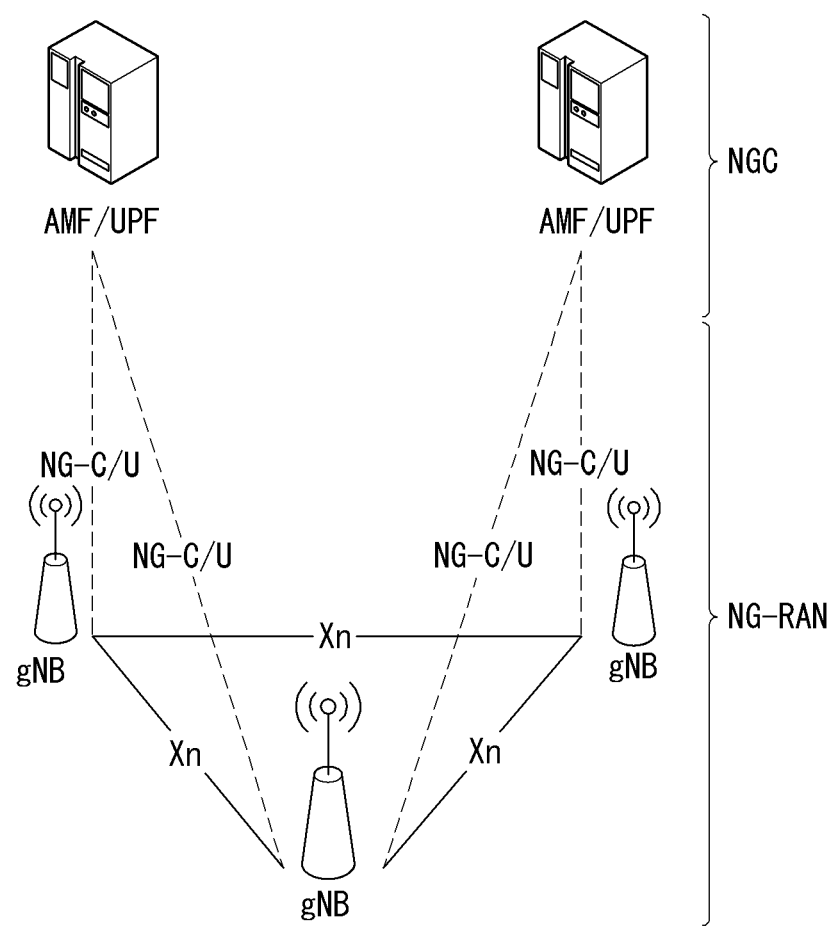

[FIG. 2]
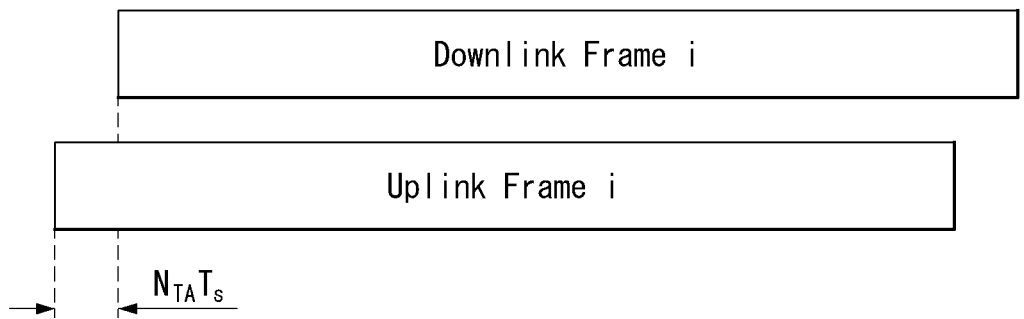

【FIG. 3】
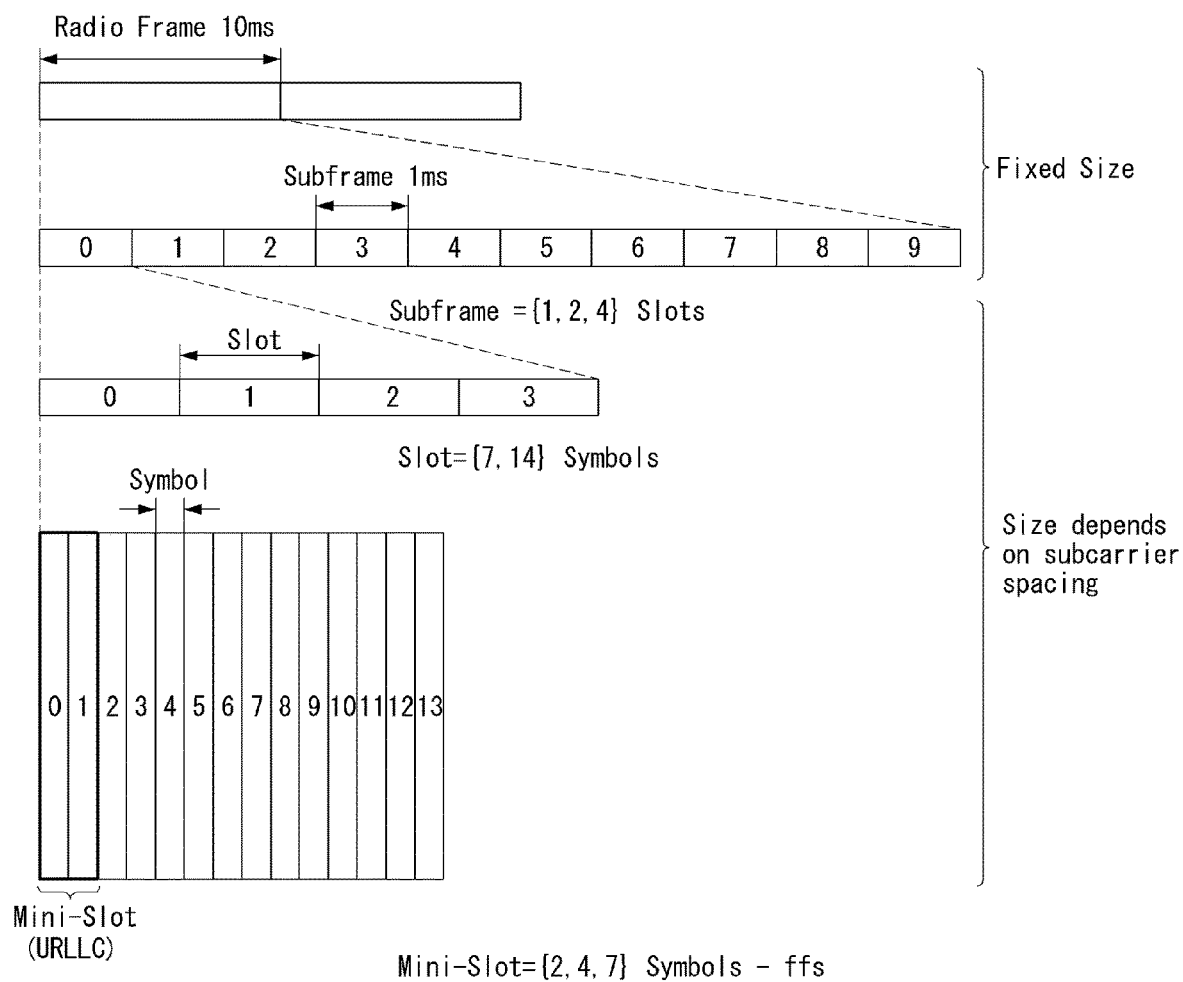

[FIG. 4]
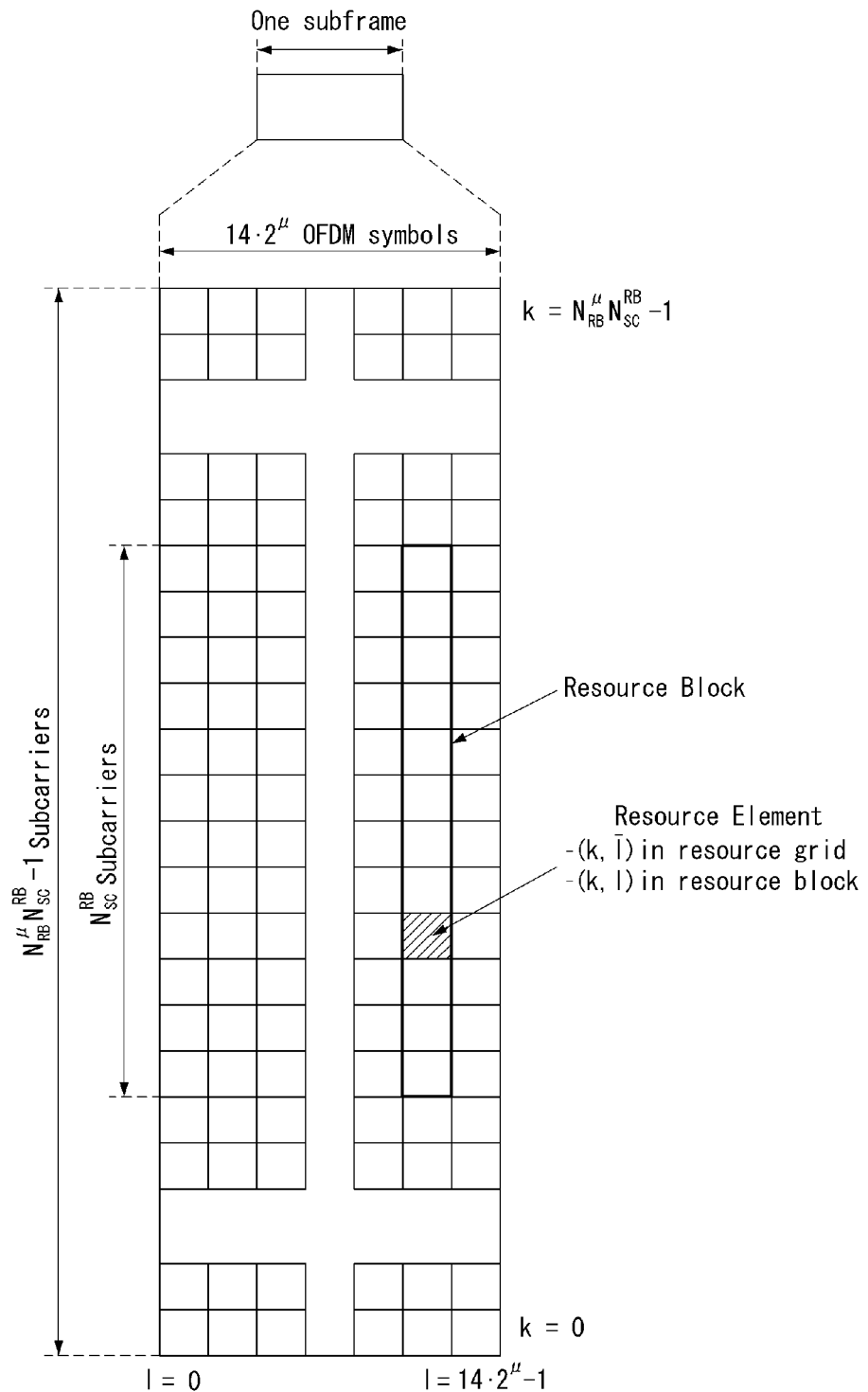

[FIG. 5]
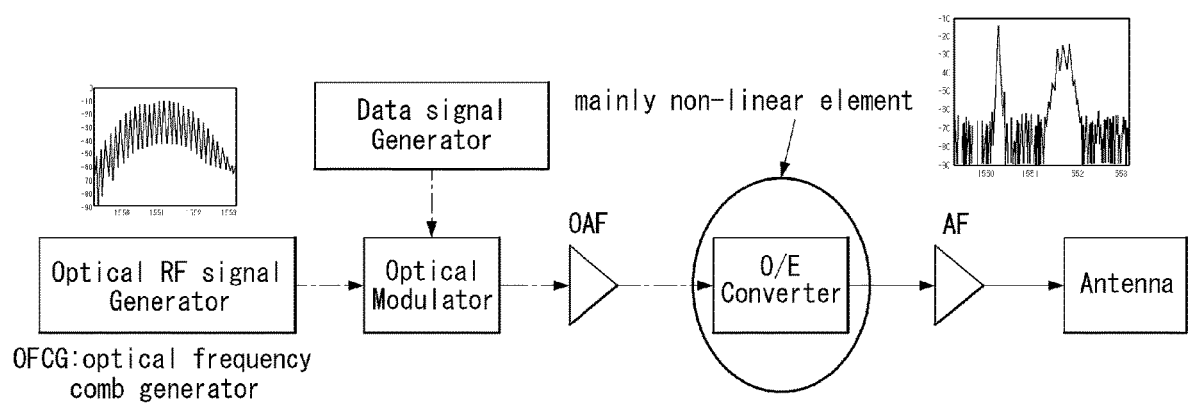

[FIG. 6]
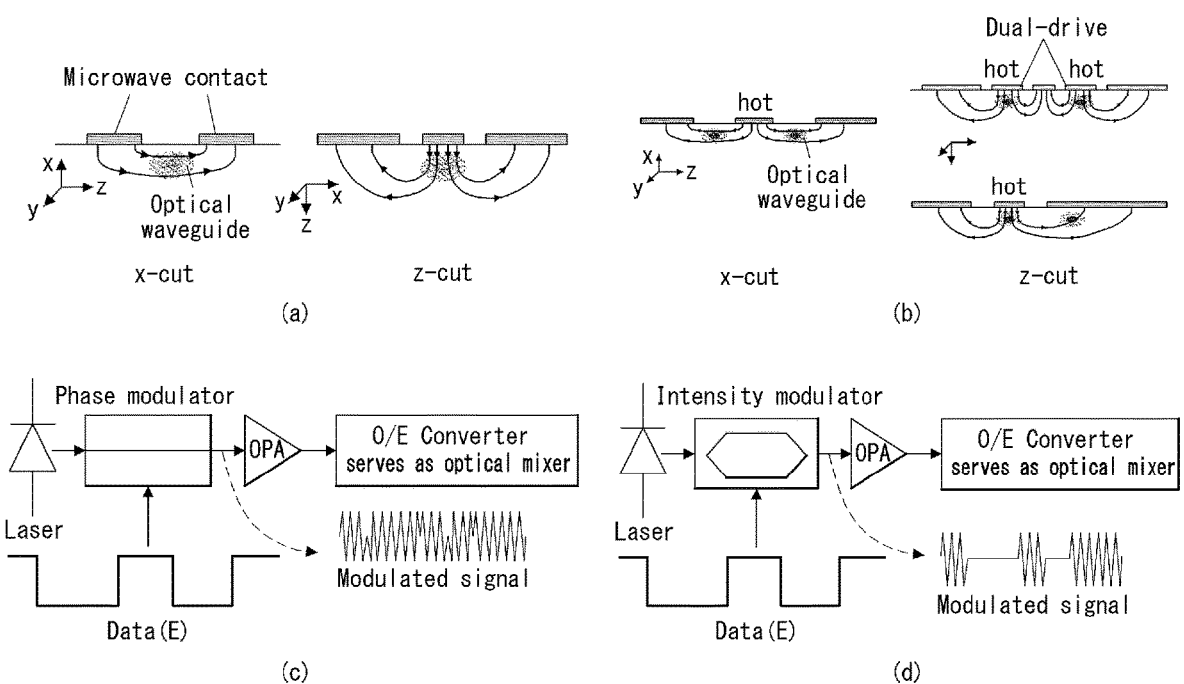

[FIG. 7]
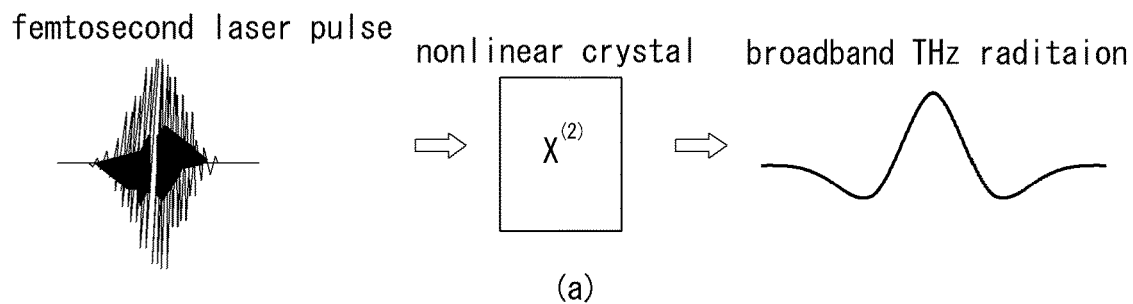
(a)
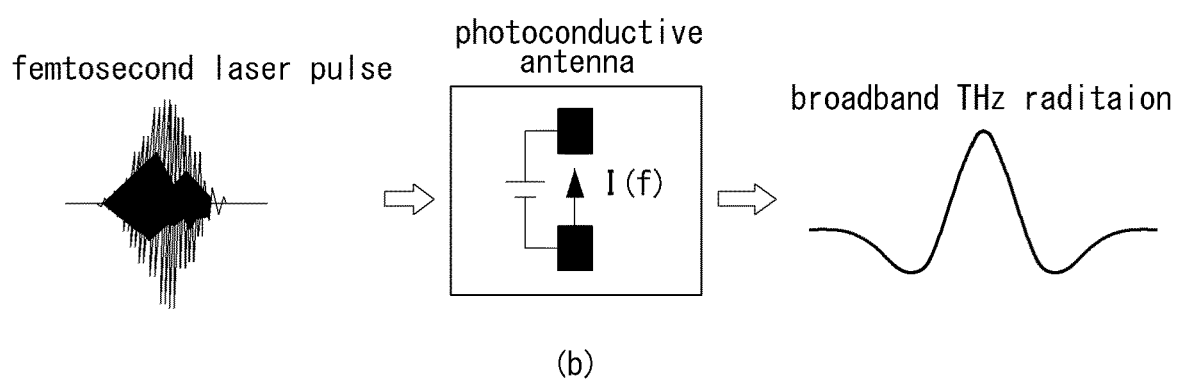
(b)
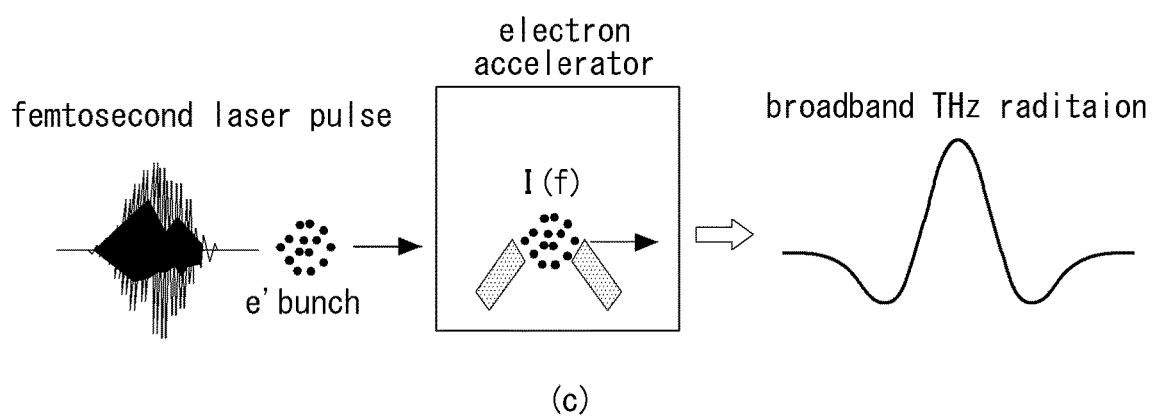
(c)

[FIG. 8]
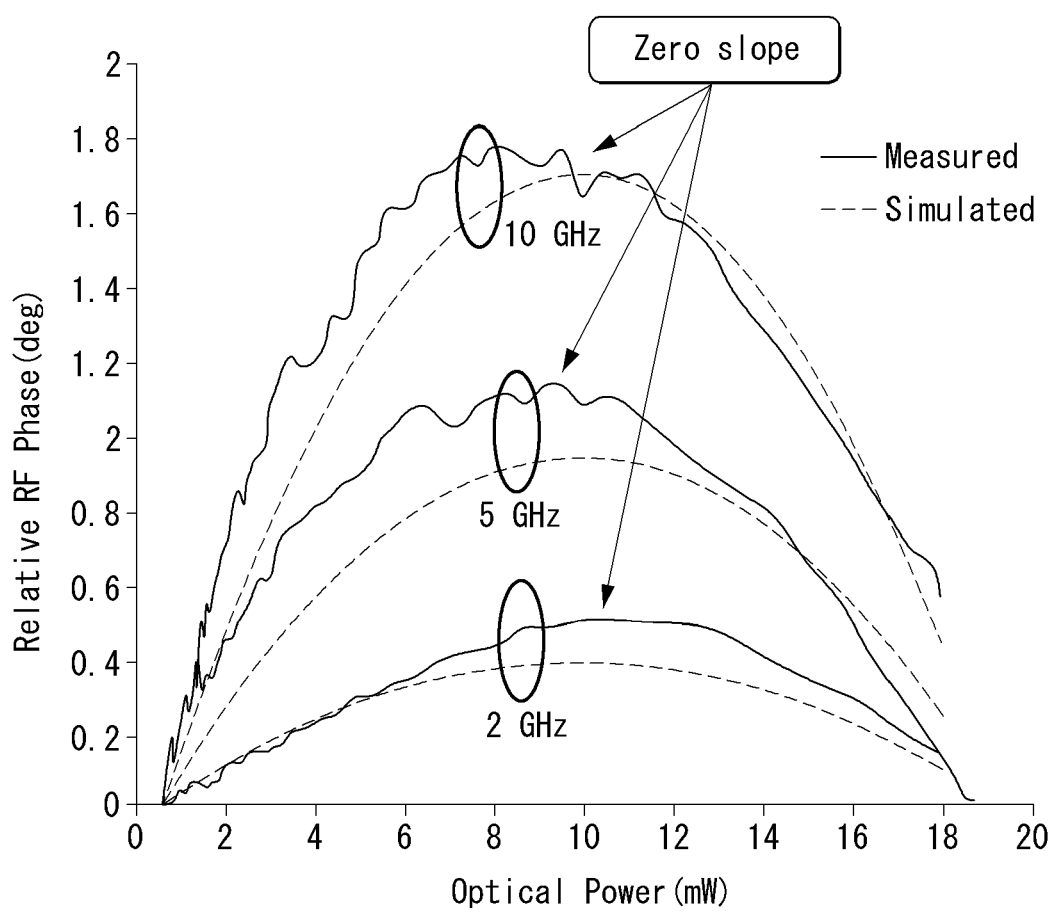

[FIG. 9]
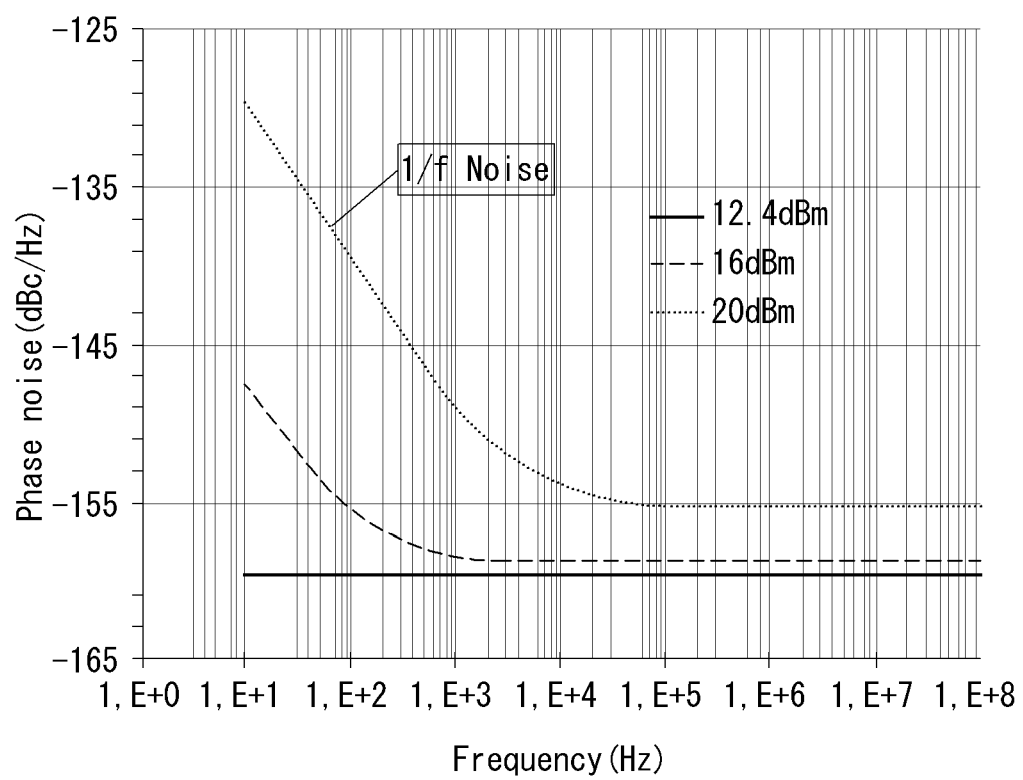

[FIG. 10]
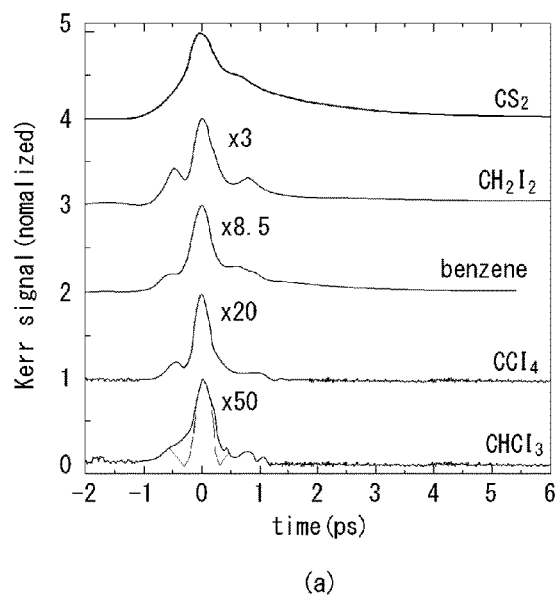
(a)
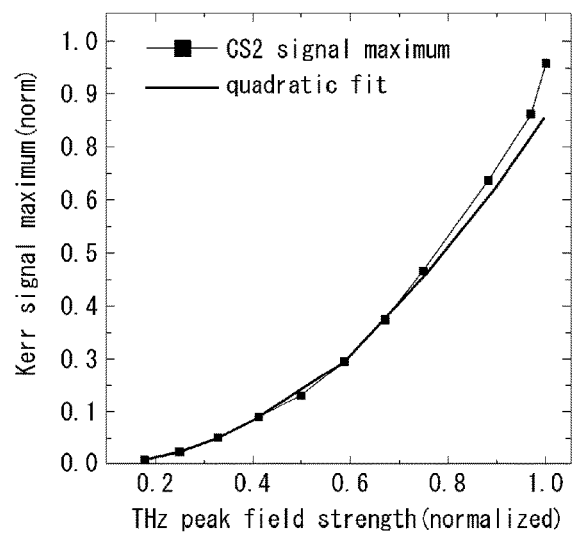
(b)

[FIG. 11]
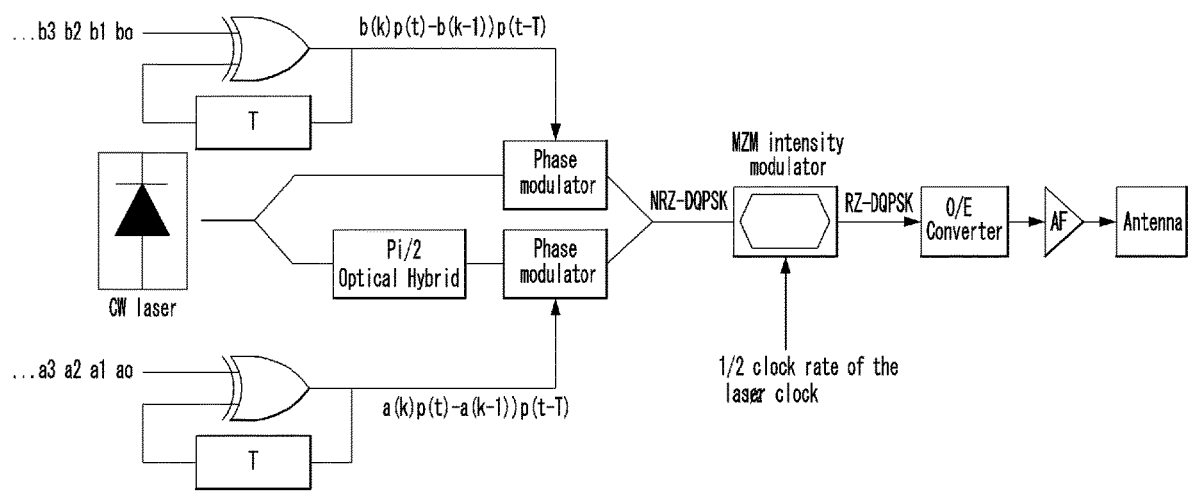

[FIG. 12]
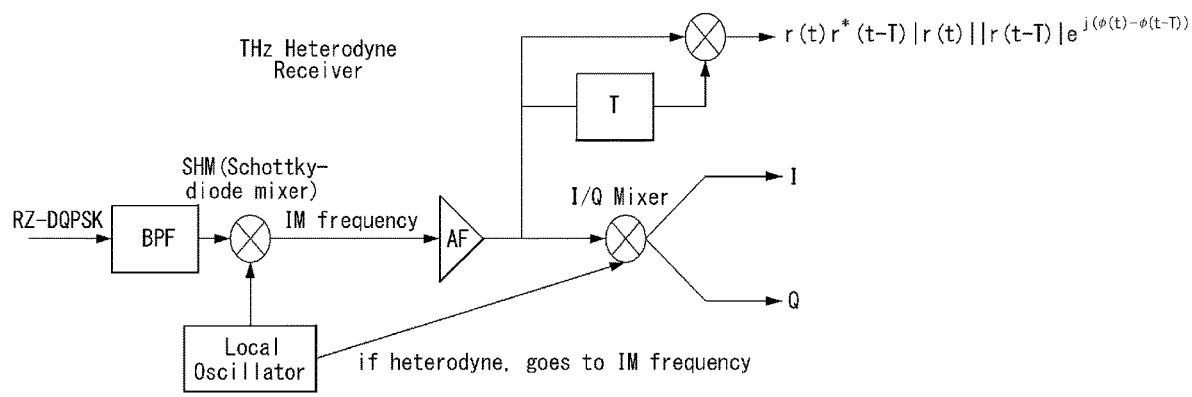

[FIG. 13]
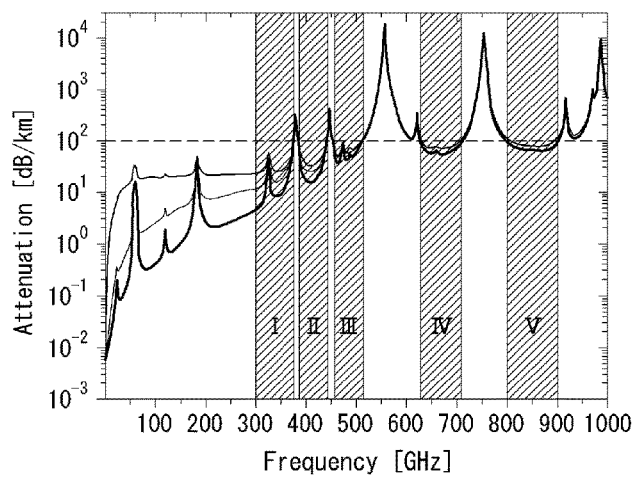
(a)
| Window # | Bandwidth [GHz] | Center Frequency [GHz] |
|---|---|---|
| I | 76 | 338 |
| II | 58 | 414 |
| III | 62 | 484 |
| IV | 85 | 669 |
| V | 94 | 855 |
(b)

[FIG. 14]
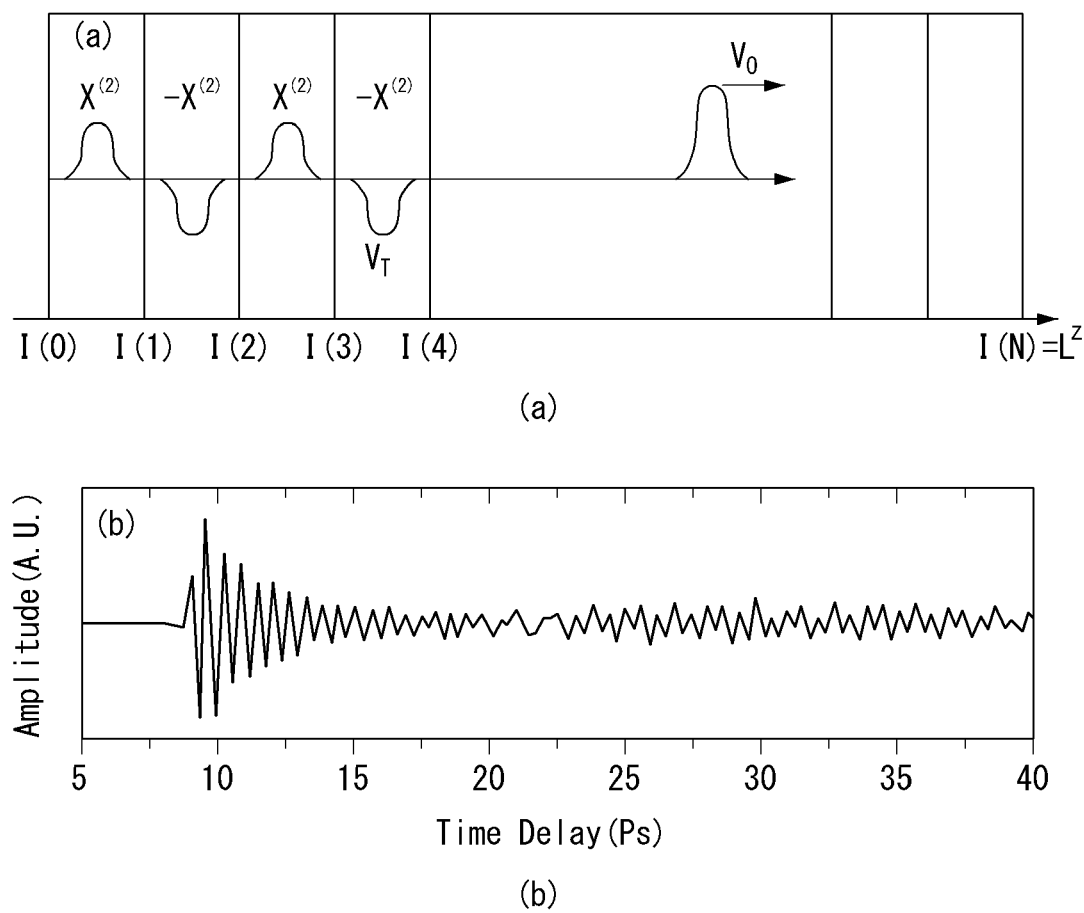

[FIG. 15]
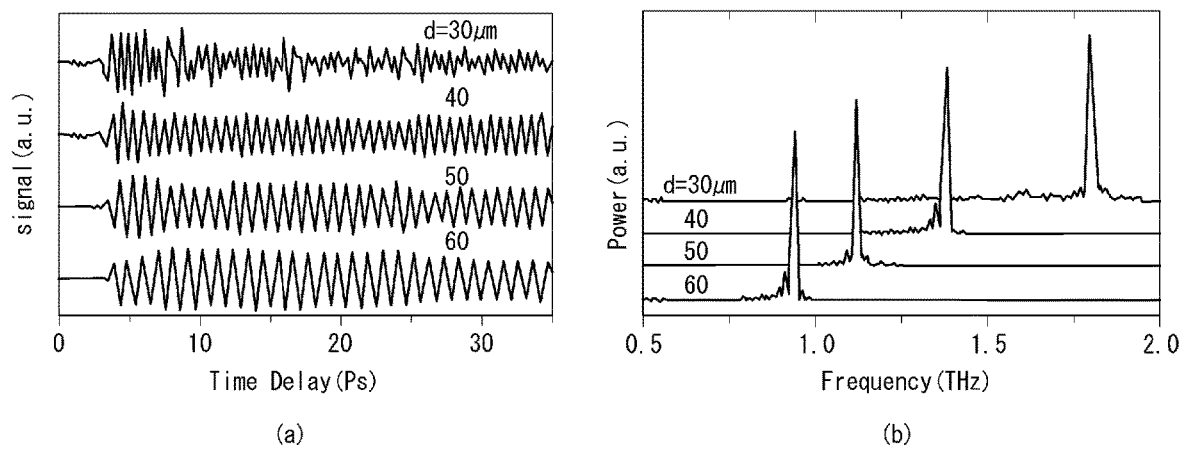
(a)
(b)

[FIG. 16]
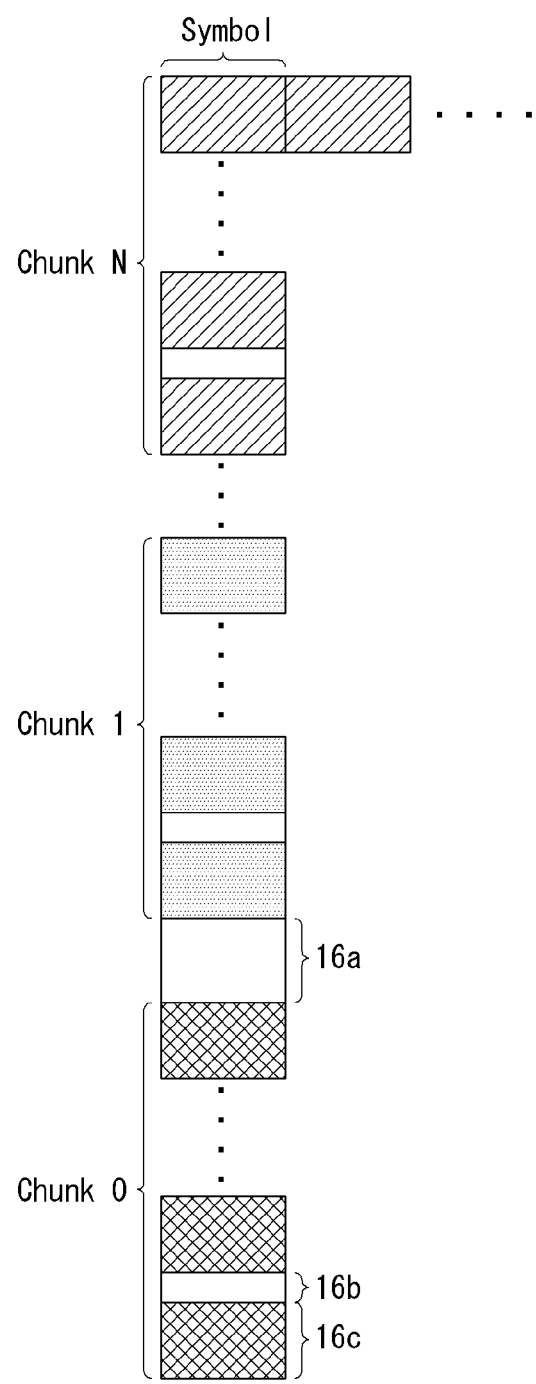

[FIG. 17]
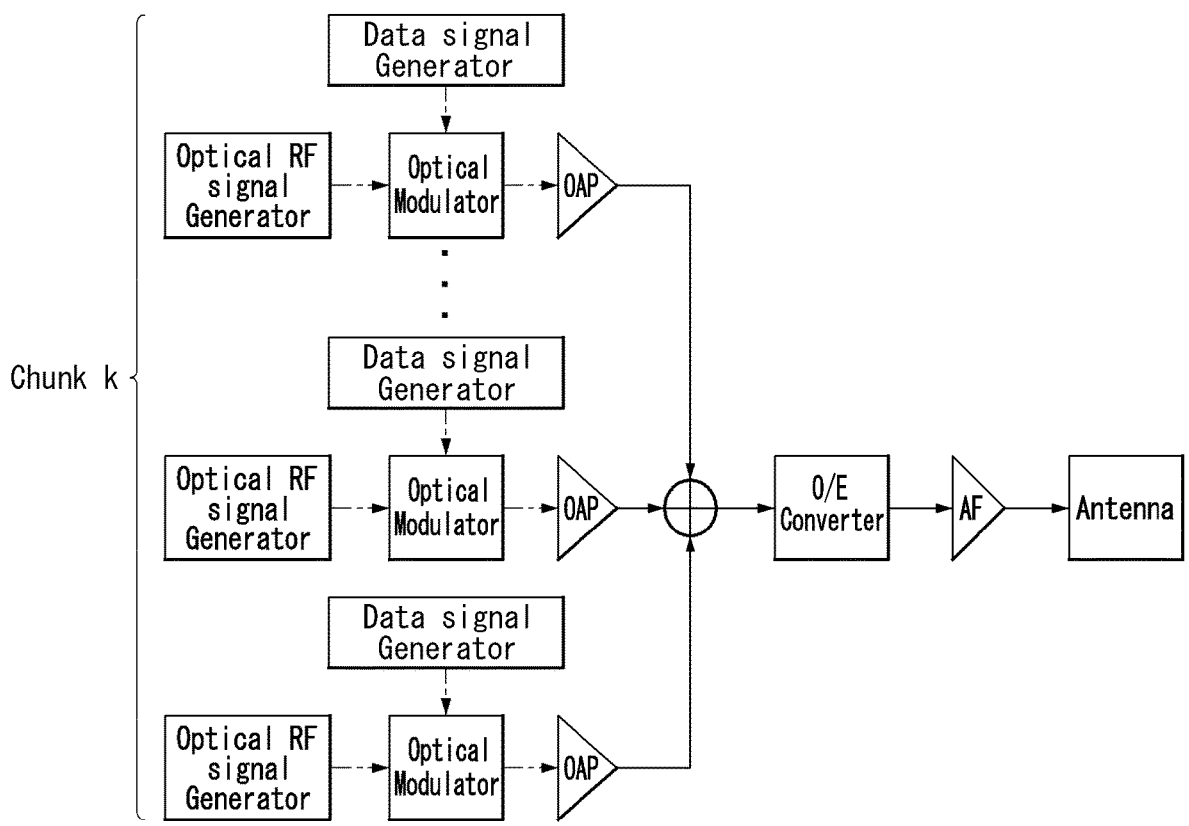

[FIG. 18]
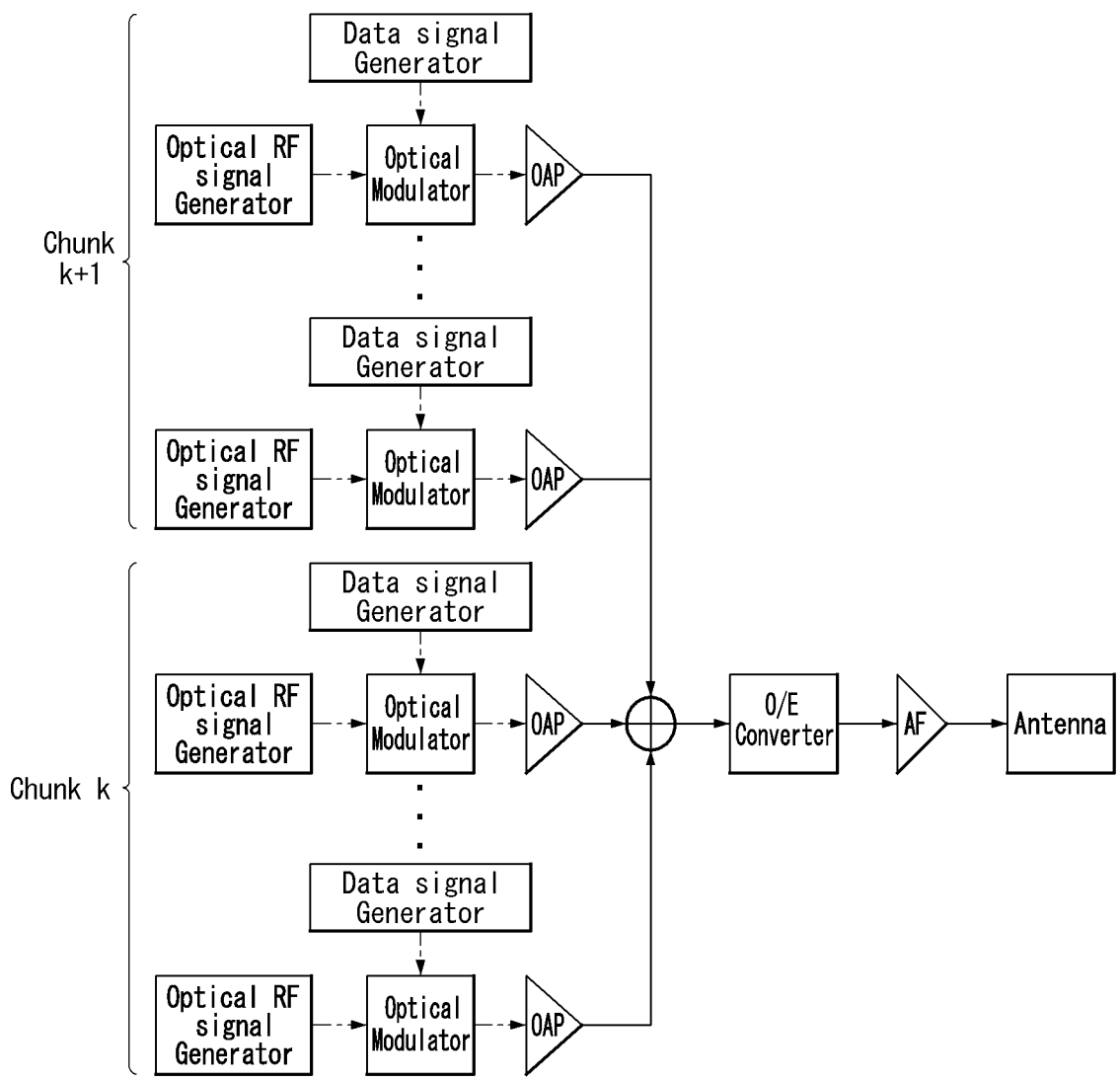

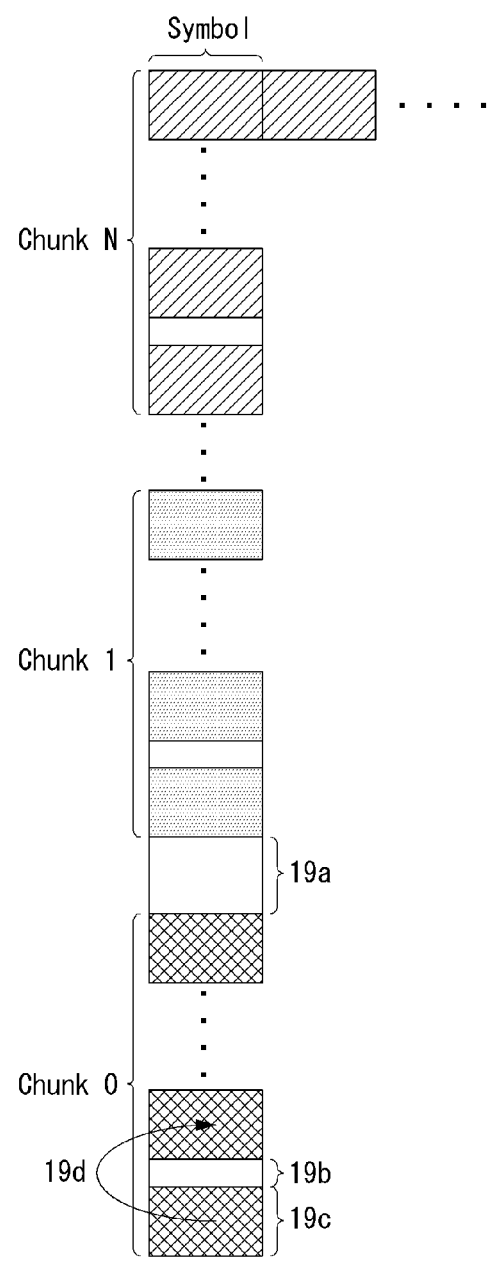
[FIG. 19]

[FIG. 20]
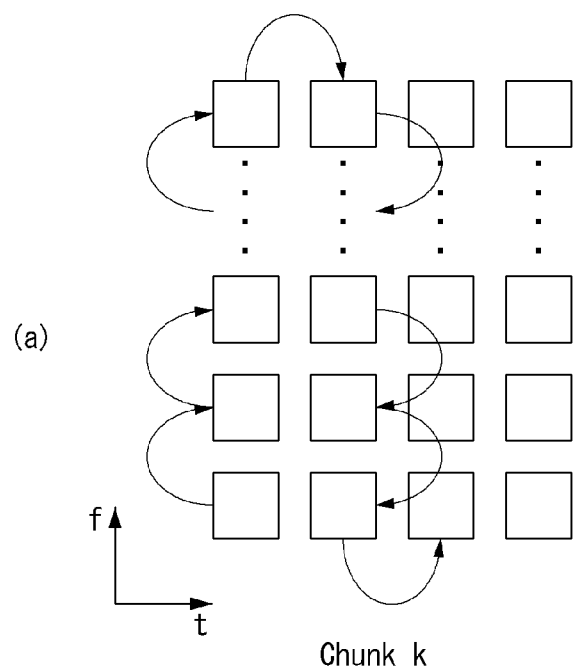
(a)
Chunk k
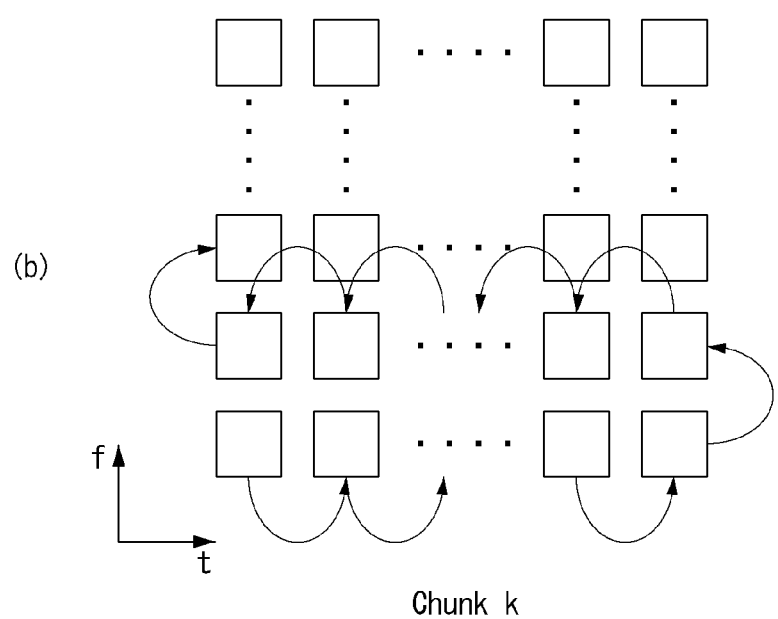
(b)
Chunk k

[FIG. 21]
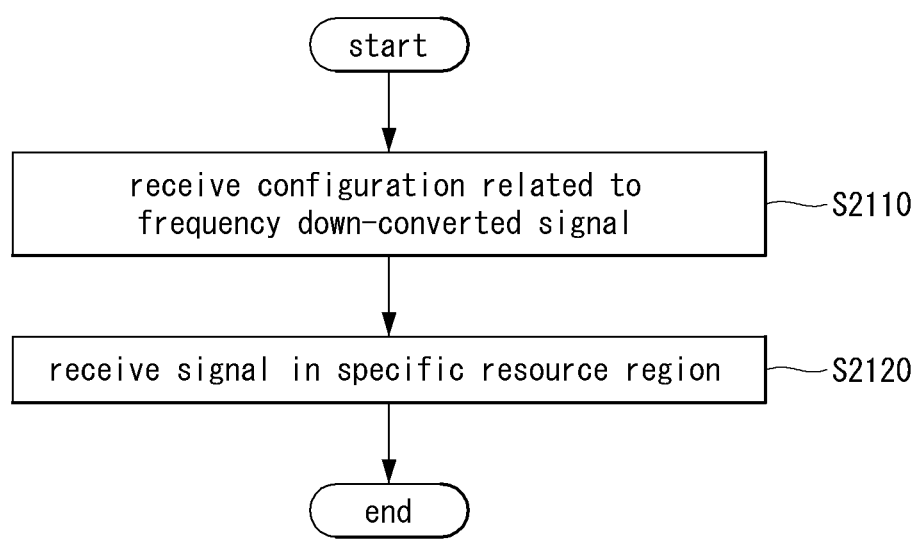

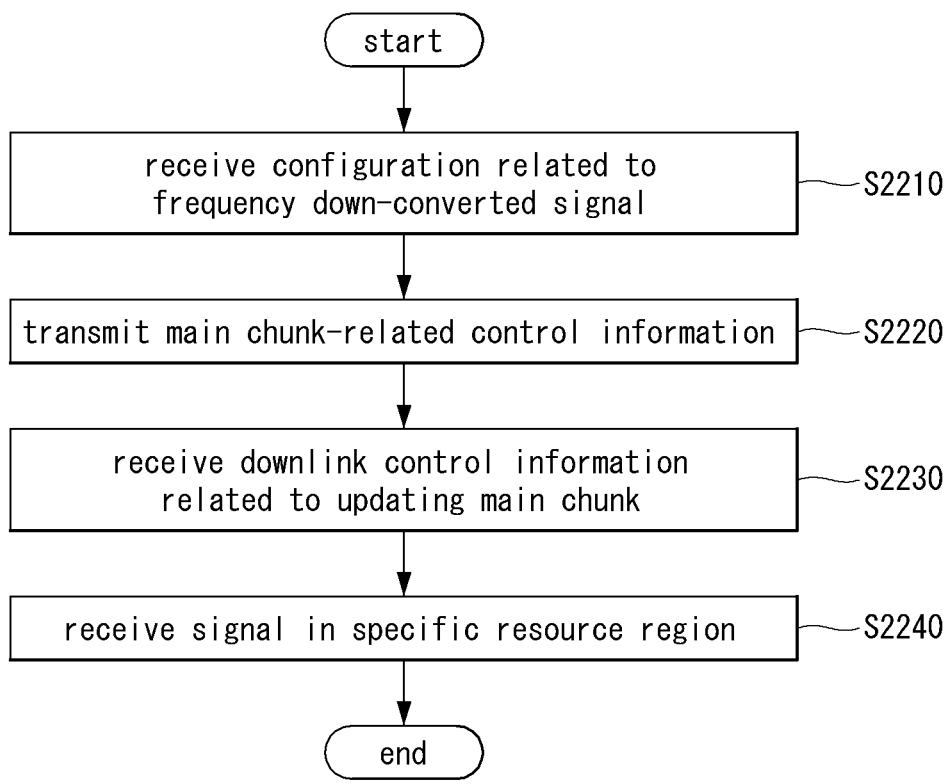
[FIG. 22]

[FIG. 23]
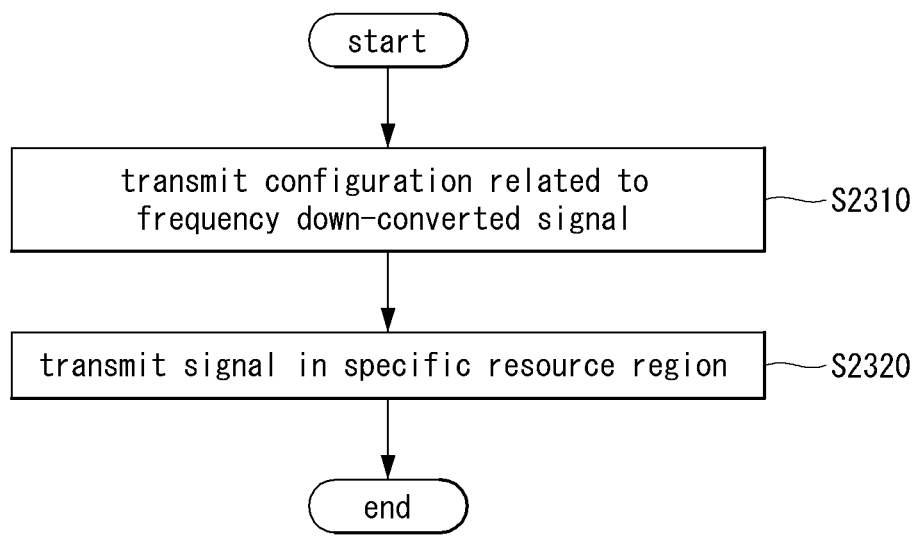

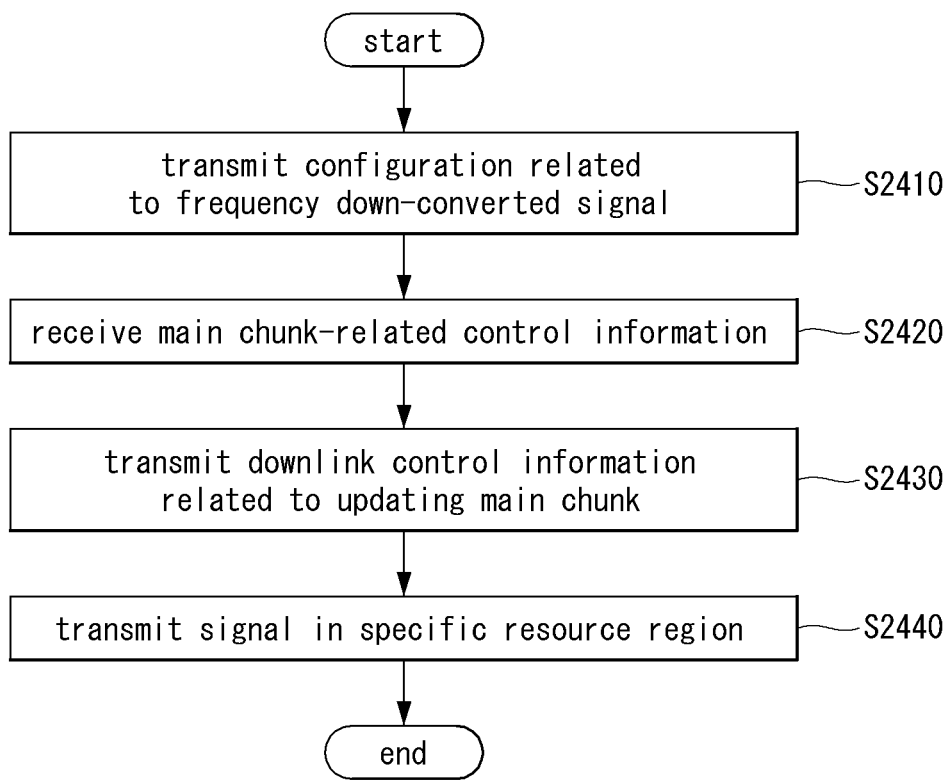
[FIG. 24]

[FIG. 25]
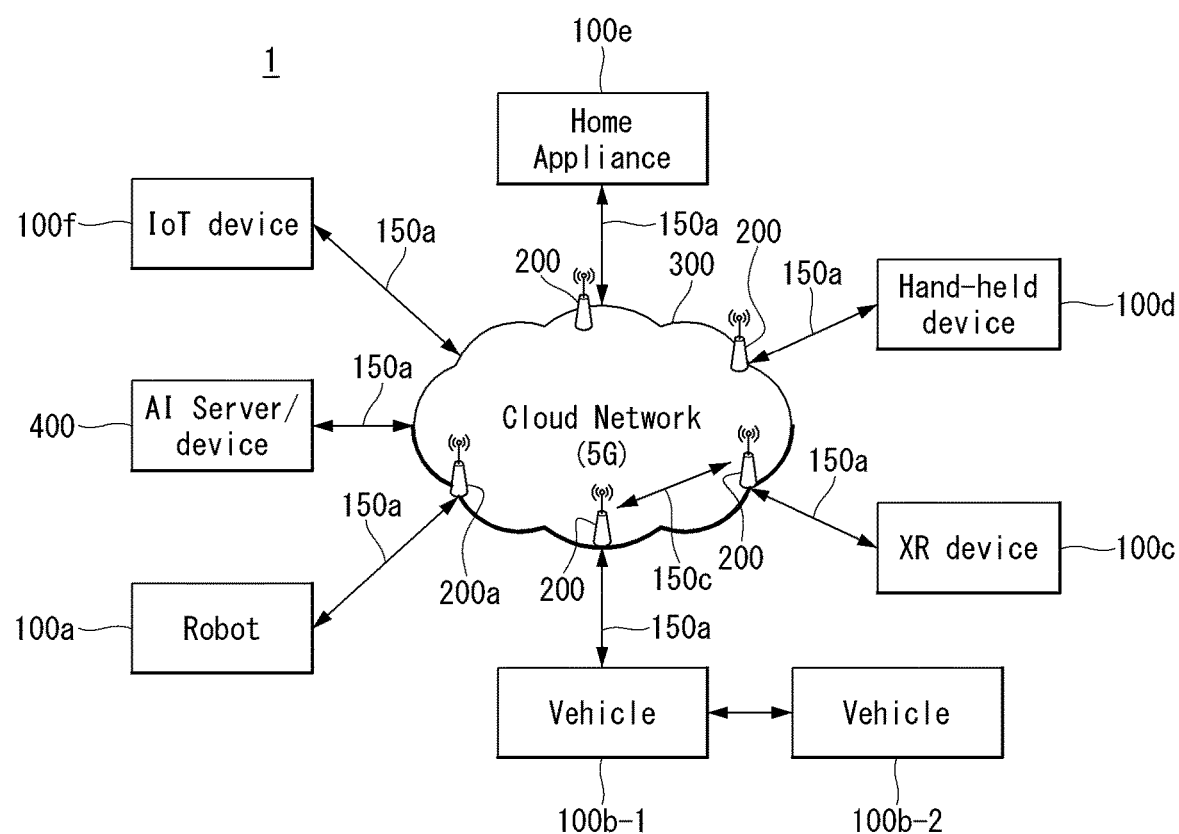

[FIG. 26]
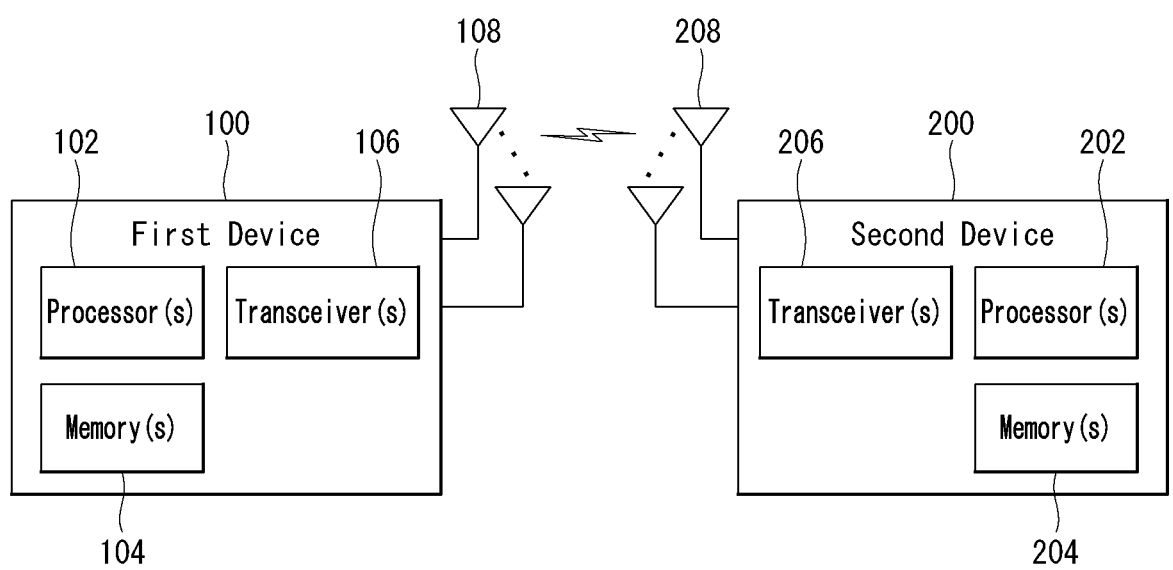

[FIG. 27]
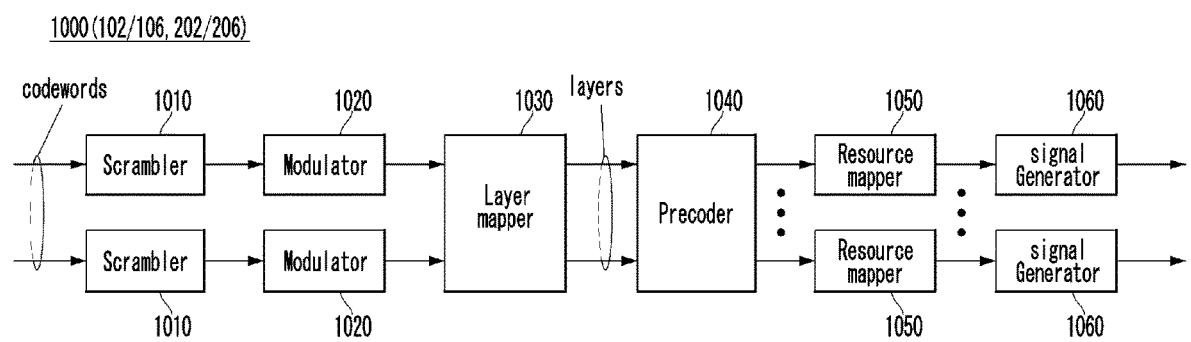

[FIG. 28]
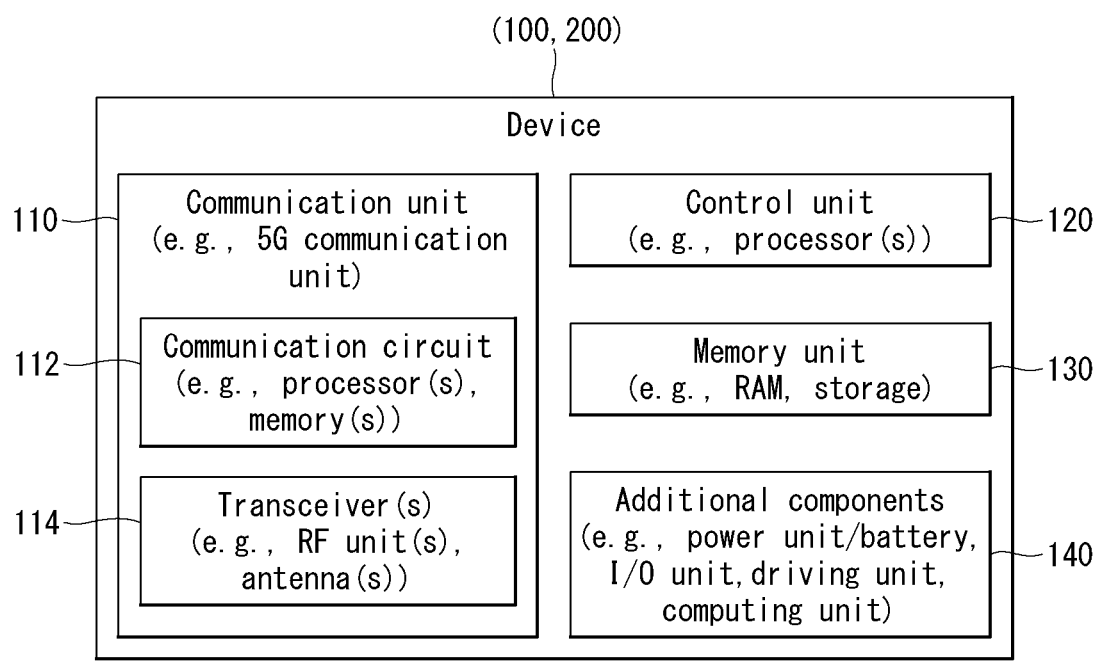

[FIG. 29]
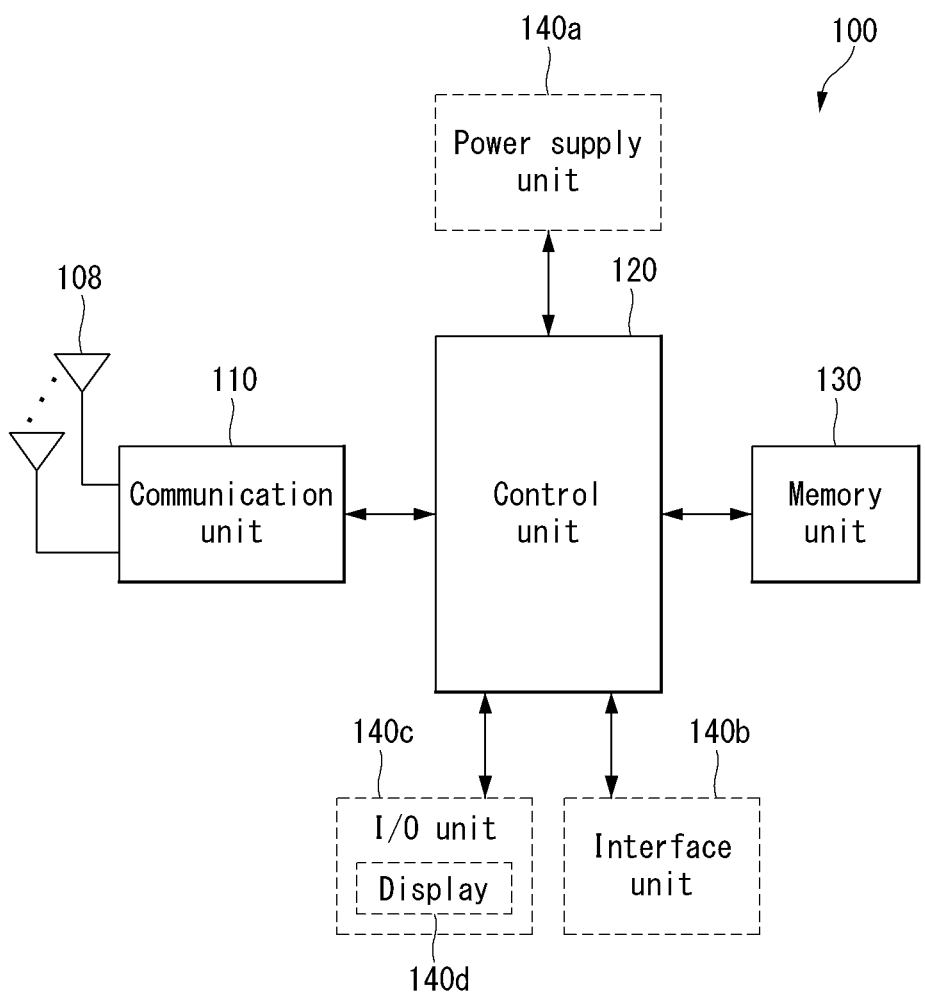

SIGNAL TRANSMISSION AND RECEPTION METHOD AND DEVICE IN WIRELESS COMMUNICATION SYSTEM

This application is the National Stage filing under 35 U.S.C. 371 of International Application No. PCT/KR2020/001251, filed on Jan. 28, 2020, which claims the benefit of Korean Application No. 10-2019-0009681, filed on Jan. 25, 2019, the contents of which are all hereby incorporated by reference herein in their entirety.

TECHNICAL FIELD

The disclosure relates to a signal transmission/reception method and device in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE DISCLOSURE

Technical Problem

The disclosure proposes a signal transmission/reception method and device capable of reducing the number of O/E converters in transmitting/receiving signals based on O/E converters in a multi-carrier system.

The technical problems to be solved by the disclosure are not limited by the above-mentioned technical problems, and other technical problems which are not mentioned above can be clearly understood from the following description by those skilled in the art to which the disclosure pertains.

Technical Solution

According to an embodiment of the disclosure, a method for receiving a signal by a user equipment (UE) in a wireless communication system comprises receiving a configuration related to a signal down-converted in frequency based on an optical-to-electrical (O/E) converter and receiving the signal in a specific resource region based on the configuration.

A frequency domain of the specific resource region includes a plurality of chunks. The chunk is composed of at least one component carrier (CC). The configuration includes information representing a main chunk related to differential phase shift keying (DPSK). Transmission of the signal is based on the DPSK applied between chunks in the frequency domain with respect to the main chunk.

The main chunk may include a target frequency band of the O/E converter.

The reception of the signal may be based on decoding performed in the specific resource region. The decoding may be performed from the main chunk.

The configuration may include information related to at least one of an order or an interval related to application of DPSK.

The DPSK may be applied between component carriers (CCs) belonging to respective ones of the plurality of chunks.

The main chunk may include a component carrier (CC) having a highest signal-to-noise ratio (SNR).

The method may further comprise transmitting control information related to the main chunk. The control information may be transmitted based on the component carrier (CC) having the highest SNR belonging to a chunk, other than the main chunk, among the plurality of chunks.

The method may further comprise receiving downlink control information related to updating the main chunk.

The DPSK may be applied with respect to the updated main chunk.

The frequency domain may include a frequency gap positioned at each specific interval. The specific interval may include at least one of the chunk or the component carrier.

According to another embodiment of the disclosure, a UE receiving a signal in a wireless communication system comprises one or more transceivers, one or more processors, and one or more memories operably connectible to the one or more processors and storing instructions to, when the reception of the signal is executed by the one or more processors, perform operations.

The operations include receiving a configuration related to a signal down-converted in frequency based on an optical-to-electrical (O/E) converter and receiving the signal in a specific resource region based on the configuration.

A frequency domain of the specific resource region includes a plurality of chunks. The chunk is composed of at least one component carrier (CC). The configuration includes information representing a main chunk related to differential phase shift keying (DPSK). Transmission of the signal is based on the DPSK applied between chunks in the frequency domain with respect to the main chunk.

The main chunk may include a target frequency band of the O/E converter.

According to still another embodiment of the disclosure, a device includes one or more memories and one or more processors functionally connected with the one or more memories.

The one or more processors control the device to receive a configuration related to a signal down-converted in frequency based on an optical-to-electrical (O/E) converter and receive the signal in a specific resource region based on the configuration.

A frequency domain of the specific resource region includes a plurality of chunks. The chunk is composed of at least one component carrier (CC). The configuration includes information representing a main chunk related to differential phase shift keying (DPSK). Transmission of the signal is based on the DPSK applied between chunks in the frequency domain with respect to the main chunk.

According to another embodiment of the disclosure, a method for transmitting a signal by a base station in a wireless communication system comprises transmitting a configuration related to a signal down-converted in frequency based on an optical-to-electrical (O/E) converter and transmitting the signal in a specific resource region based on the configuration.

A frequency domain of the specific resource region includes a plurality of chunks. The chunk is composed of at least one component carrier (CC). The configuration includes information representing a main chunk related to differential phase shift keying (DPSK). Transmission of the signal is based on the DPSK applied between chunks in the frequency domain with respect to the main chunk.

According to another embodiment of the disclosure, a base station transmitting a signal in a wireless communication system comprises one or more transceivers, one or more processors, and one or more memories operably connectible to the one or more processors and storing instructions to, when the transmission of the signal is executed by the one or more processors, perform operations.

The operations include transmitting a configuration related to a signal down-converted in frequency based on an optical-to-electrical (O/E) converter and transmitting the signal in a specific resource region based on the configuration.

A frequency domain of the specific resource region includes a plurality of chunks. The chunk is composed of at least one component carrier (CC). The configuration includes information representing a main chunk related to differential phase shift keying (DPSK). Transmission of the signal is based on the DPSK applied between chunks in the frequency domain with respect to the main chunk.

According to another embodiment of the disclosure, one or more non-transitory computer-readable media store one or more instructions.

The one or more instructions executable by one or more processors are configured to control a UE to receive a configuration related to a signal down-converted in frequency based on an optical-to-electrical (O/E) converter and receive the signal in a specific resource region based on the configuration.

A frequency domain of the specific resource region includes a plurality of chunks. The chunk is composed of at least one component carrier (CC). The configuration includes information representing a main chunk related to differential phase shift keying (DPSK). Transmission of the signal is based on the DPSK applied between chunks in the frequency domain with respect to the main chunk.

Advantageous Effects

According to an embodiment of the disclosure, a frequency down-converted signal based on an O/E converter is transmitted in a specific resource region. A frequency domain of the specific resource region includes a plurality of chunks, and wherein the chunk is composed of at least one component carrier (CC). Accordingly, the number of O/E converters required for signal transmission in the multi-carrier system is reduced, thereby reducing implementation complexity.

Also, according to an embodiment of the disclosure, the transmission of a signal is based on differential phase shift keying (DPSK) applied between chunks in the frequency domain with respect to a main chunk. Therefore, even when the multi-carrier system does not include as many O/E converters as the total number of carriers, decoding may be easily performed based on the DPSK, thereby minimizing communication quality degradation due to a phase error.

Effects which may be obtained by the disclosure are not limited to the aforementioned effects, and other technical effects not described above may be evidently understood by a person having ordinary skill in the art to which the disclosure pertains from the following description.

BRIEF DESCRIPTION OF THE DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the disclosure is applicable.

FIG. 2 illustrates a relationship between an uplink frame and a downlink frame in a wireless communication system to which a method proposed by the disclosure is applicable.

FIG. 3 illustrates an example of a frame structure in an NR system.

FIG. 4 illustrates an example of a resource grid supported by a wireless communication system to which a method proposed in the disclosure is applicable.

FIG. 5 illustrates an example structure of a photonic source-based transmitter to which a method proposed in the disclosure is applicable.

FIG. 6 illustrates an example structure of an optical modulator to which a method proposed in the disclosure is applicable.

FIG. 7 illustrates an example operation scheme of an O/E converter to which a method proposed in the disclosure is applicable.

FIGS. 8 and 9 are views illustrating phase noise related to operations of an O/E converter to which a method proposed in the disclosure is applicable.

FIG. 10 is a view illustrating a Kerr effect related to phase noise of an O/E converter to which a method proposed in the disclosure is applicable.

FIGS. 11 and 12 are views illustrating photonic source-based differential quadrature phase shift keying to which a method proposed in the disclosure is applicable.

FIG. 13 is a view illustrating an available band up to one terahertz considering signal attenuation to which a method proposed in the disclosure is applicable.

FIG. 14 is a view illustrating generation of a terahertz pulse and a terahertz waveform to which a method proposed in the disclosure is applicable.

FIG. 15 is a view illustrating the relationship between medium type and modulation in an O/E converter to which a method proposed in the disclosure is applicable.

FIG. 16 illustrates an example frame structure for a terahertz multi-carrier system according to an embodiment of the disclosure.

FIG. 17 illustrates an example structure of a photonic source-based terahertz transmitter according to an embodiment of the disclosure.

FIG. 18 illustrates another example structure of a photonic source-based terahertz transmitter according to an embodiment of the disclosure.

FIG. 19 illustrates an example frame structure for a terahertz multi-carrier system considering phase noise according to an embodiment of the disclosure.

FIG. 20 is a view illustrating a specific scheme of differential phase shift keying (DPSK) according to an embodiment of the disclosure.

FIG. 21 is a flowchart illustrating a method for receiving a signal by a UE in a wireless communication system according to an embodiment of the disclosure.

FIG. 22 is a flowchart illustrating a method for receiving a signal by a UE in a wireless communication system according to another embodiment of the disclosure.

FIG. 23 is a flowchart illustrating a method for transmitting a signal by a base station in a wireless communication system according to an embodiment of the disclosure.

FIG. 24 is a flowchart illustrating a method for transmitting a signal by a base station in a wireless communication system according to another embodiment of the disclosure.

FIG. 25 illustrates a communication system 1 applied to the disclosure.

FIG. 26 illustrates a wireless device applicable to the disclosure.

FIG. 27 illustrates a signal processing circuit applied to the disclosure.

FIG. 28 illustrates another example of a wireless device applied to the disclosure.

FIG. 29 illustrates a hand-held device applied to the disclosure.

MODE FOR CARRYING OUT THE DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the disclosure may refer to a background art, terms, abbreviations, etc., used for describing the disclosure. For example, the following documents may be referenced.

3GPP LTE 36.211: Physical channels and modulation
36.212: Multiplexing and channel coding
36.213: Physical layer procedures
36.300: Overall description
36.331: Radio Resource Control (RRC)

3GPP NR 38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, $\mu$). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| $\mu$ | $\Delta f = 2^\mu \cdot 15$ [kHz] | Cyclic prefix |
|---|---|---|
| 0 | 15 | normal |
| 1 | 30 | normal |
| 2 | 60 | Normal, Extended |
| 3 | 120 | normal |
| 4 | 240 | normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the disclosure is applicable.

As illustrated in FIG. 2, uplink frame number i for transmission from the user equipment (UE) should begin $T_{TA}=N_{TA}T_s$ earlier than the start of the downlink frame by the UE.

For numerology $\mu$, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| $\mu$ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 3 illustrates an example of a frame structure in a NR system. FIG. 3 is merely for convenience of explanation and does not limit the scope of the disclosure.

In Table 4, in case of $\mu$=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^{\mu} N_{sc}^{RB}$ subcarriers on a frequency domain, each subframe consisting of 14·2$\mu$ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

Hereinafter, matters related to a transmission/reception structure in a terahertz frequency band are described.

In a THz communication system, two main transmission/reception design methods are considered.

The first method is an up-conversion method in which information is loaded in a base band, modulated into a target band (i.e., a THz band), and transmitted or received like in a conventional communication system. However, there is an issue that development of a THz hardware device capable of realizing this should be preceded.

The other method is a down-conversion method. This method gains popularity for transmission/reception systems thanks to the advent of optical-to-electrical converter elements. The O/E converter performs modulation using a source, such as a laser, which has been conventionally used in an infrared radio band, and down-modulates an infrared band to a terahertz band (THz band).

Hereinafter, matters related to generation of a terahertz pulse are described.

A terahertz pulse (THz pulse) may be generated using a photonic source. Specifically, a method mainly used for generating a terahertz pulse is a method in which a photonic source is generated using an infrared laser (a sampling resolution of about 70 fs), and then it is modulated into a terahertz band. Such a photonic source-based THz communication system has the following advantages.

It may be easily implemented using existing elements. Further, a high transmission rate may be provided through an optical generator and a modulator. Although it is possible to provide a high sampling rate (up to about peta (10^15) class (fs) for a single carrier), it may actually support a bandwidth of 100 Gbps class (THz class). High transmit power (laser power) may be provided. Accordingly, high broadband transmission is possible.

In contrast, the above-described method has disadvantages in relation to the following points.

Dispersion (chromatic dispersion or polarization mode dispersion) and laser noise due to the optical generator's own limitations.

Velocity matching of the modulator.

Influence by nonlinear optical elements during down-conversion.

Issues with utilization of an allocable spectrum.

Hereinafter, the structure of the O/E converter is described in detail with reference to FIGS. 5 and 6.

FIG. 5 illustrates an example structure of a photonic source-based transmitter to which a method proposed in the disclosure is applicable.

FIG. 6 illustrates an example structure of an optical modulator to which a method proposed in the disclosure is applicable.

In general, the phase of a signal may be changed by passing an optical source of a laser through an optical wave guide. In this case, data is loaded by changing the electrical characteristics through a microwave contact or the like. Accordingly, an optical modulator output is formed as a modulated waveform.

FIG. 7 illustrates an example operation scheme of an O/E converter to which a method proposed in the disclosure is applicable. The O/E converter may generate a terahertz pulse according to the method illustrated in connection with (a) of FIG. 7 to (c) of FIG. 7.

(a) of FIG. 7 illustrates an optical rectification operation by a nonlinear crystal.

(b) of FIG. 7 illustrates O/E conversion by a photoconductive antenna.

(c) of FIG. 7 illustrates emissions from a bunch of relativistic electrons of the light flux.

The terahertz pulse (THz pulse) generated in the above manner may have a length in femtoseconds to picoseconds.

Hereinafter, matters related to the phase noise of the O/E converter are described.

As illustrated in FIG. 7, an O/E converter basically performs down conversion using non-linearity of an element.

In contrast, the non-linearity of the element causes several phenomena.

Typically, a phenomenon called the Pockels effect is a phenomenon that induces deformation of polarization due to non-linearity. The Pockels effect may be expressed by Equation 1 below.

$$n(E) = n - \tfrac{1}{2} r \cdot n^3 E \qquad \text{[Equation 1]}$$

In Equation 1, the Pockels coefficient is $$r = -2 \frac{a_1}{n^3}.$$

Another representative phenomenon is a phenomenon called the Kerr effect. The Kerr effect is a phenomenon in which the refractive index changes due to non-linearity of a material. The Kerr effect may be expressed by Equation 2 below.

$$n(E) = n - \tfrac{1}{2} s \cdot n^3 E^2 \qquad \text{[Equation 2]}$$

In Equation 2, the Kerr coefficient is $$s = -\frac{a_2}{n^3}.$$

Basically, self-phase modulation (SPM), cross-phase modulation (CPM), and/or four-wave mixing (FWM) occur due to the Kerr effect. These phenomena are related to phase errors. FIGS. 8 and 9 illustrate phase noise in this regard. FIG. 8 is a graph illustrating an RF phase according to input power, and FIG. 9 is a graph illustrating phase noise according to the optical power level around a radio frequency carrier of 10 GHz.

As shown in Equation 2, the Kerr effect is produced not only by the deformation of the medium, but also by the electric field or the electric force input to the non-linearity element.

To measure the phenomenon of the Kerr effect, a Kerr signal is generated. A Kerr signal may be obtained by normalizing a difference between the received signal and a Kerr effect-free signal.

The Kerr signal may be expressed by Equation 3 below.

$$\frac{\Delta I}{I} = \sin \frac{\Delta n \omega L}{c} \qquad \text{[Equation 3]}$$

Here, $$\Delta n(\omega') = 2n_2 < E(\omega)E(\omega) > n_2 = \frac{3}{2n_0} \chi^{(3)}(\omega')$$

Table 5 below summarizes parameters related to the Kerr signal for each material.

TABLE 5

| Liquid | $\Delta n$ ×10$^{-6}$ | K (10$^{-14}$ m/V) | $n_2'$ (10$^{-16}$ cm$^2$/W) | $n_2'$ [3] (10$^{-16}$ cm$^2$/W) | $\chi^{(3)}$ (10$^{-20}$ m$^2$/V$^2$) | $\tau_0$ (ps) |
|---|---|---|---|---|---|---|
| $CS_2$ | 4.3 | 2.4 | 440 | 332 | 2.08 | 1.7 |
| Benzene | 0.5 | 0.26 | 56 | 168 | 0.22 | 2.1 |
| $CCl_4$ | 0.23 | 0.12 | 27 | 15 | 0.10 | — |
| $CHCl_4$ | 0.086 | 0.045 | 10 | 30 | 0.04 | — |
| $CH_2I_2$ | 1.4 | 0.75 | 140 | 147 | 0.70 | 13 |

$\Delta n$ is the refractive index change. n2 is the nonlinear refractive index in terms of intensity. $\chi(\omega THz, \omega THz, \omega opt)$ is the nonlinear susceptibility. $\tau_0$ is the rotational relaxation time constant for the THz Kerr effect in various liquids.

The measured THz pulse parameters used for the calculation are duration 1 ps, beam diameter at focus 2 mm, and energy 1.5 µJ. This corresponds to a peak field of 150 kV/cm and a peak intensity of 50 MW/cm2.

As shown in Table 5, the non-linear Kerr effect may vary depending on which material the O/E converter is implemented of. This is because, in theory, the value varies according to the third-order susceptibility. Kerr signals appear in different forms according to the characteristics of the medium and the strength of the input signal. In this regard, FIG. 10 illustrates an example Kerr signal. Specifically, (a) of FIG. 10 is a graph illustrating the Kerr signal according to the material, and (b) of FIG. 10 is a graph illustrating the Kerr signal according to the terahertz peak field strength.

Hereinafter, matters related to terahertz phase shift modulation (THz DPSK) based on a photon source are discussed.

Transmission and reception of a THz signal using a photonic source may be implemented based on DPSK according to the structure of phase modulators.

The DPSK has the following advantages as a pulse is transmitted as a difference in information. According to the DPSK, it is possible to detect the current received signal information compared to the previous signal and to estimate the phase difference through the received signal detection. Also, there is no need to design a reference signal necessary to estimate the phase error on the framework.

FIGS. 11 and 12 are views illustrating photonic source-based differential quadrature phase shift keying to which a method proposed in the disclosure is applicable.

FIG. 11 illustrates an example structure of a photonic source-based THz transmitter to which DQPSK is applied, and FIG. 12 illustrates an example structure of a THz heterodyne receiver.

Hereinafter, matters related to THz spectrum usage are discussed.

Plans related to spectrum usage up to 1 terahertz (1 THz) may be classified as follows.

WRC-12: All frequencies in the range 1000-3000 GHz may be used by both active and passive services.

Radio astronomy service: 275-323 GHz, 327-371 GHz, 388-424 GHz, 426-442 GHz, 453-510 GHz, 623-711 GHz, 795-909 GHz and 926-945 GHz;

Earth exploration-satellite service (passive) and space research service (passive): 275-286 GHz, 296-306 GHz, 313-356 GHz, 361-365 GHz, 369-392 GHz, 397-399 GHz, 409-411 GHz, 416-434 GHz, 439-467 GHz, 477-502 GHz, 523-527 GHz, 538-581 GHz, 611-630 GHz, 634-654 GHz, 657-692 GHz, 713-718 GHz, 729-733 GHz, 750-754 GHz, 771-776 GHz, 823-846 GHz, 850-854 GHz, 857-862 GHz, 866-882 GHz, 905-928 GHz, 951-956 GHz, 968-973 GHz and 985-990 GHz.

WRC-15: (Korean) 128-130 GHz, 171-171.6 GHz, 172.2-172.8 GHz and 173.3-174 GHz are also allocated to the radio astronomy service on a primary basis. Not claim protection from, or constrain the use and development of, services in other countries operating in accordance with the Radio Regulations WRC-19: (agenda 1.15) 275~450 GHz-related spectrum fixing plan (Land mobile, fixed service-related)

Spectrum usage Plan (Mobile, Fixed): the same for the U.S. and Europe

FCC: 102~109.5, 111.8~114.25, 122.25~123, 130~134, 141~148.5, 151.5~164, 167~174.8, 191.8~200, 209~226, 231.5~235, 238~241, 252~275 GHz

CEPT(ERC): 102~109.5, 111.8~114.25, 122.25~123, 130~134, 141~148.5, 151.5~164, 167~174.8, 191.8~200, 209~226, 231.5~235, 238~241, 252~275 GHz

With reference to the plans related to spectrum usage, there is a high chance to use several contiguous gigahertz bands for a fixed or mobile service usage for a terahertz system. In this regard, FIG. 13 illustrates available bands.

FIG. 13 is a view illustrating an available band up to one terahertz considering signal attenuation to which a method proposed in the disclosure is applicable. (a) of FIG. 13 is a graph illustrating signal attenuation up to 1 THz, and (b) of FIG. 13 is a table summarizing bandwidths and center frequencies in the sections available with respect to a specific signal attenuation value (10^2 dB/km).

According to the outdoor scenario standard as illustrated in FIG. 13, available bandwidths may be classified with respect to an oxygen attenuation of 10^2 dB/km in spectra up to 1 THz. Accordingly, a framework in which the available bandwidth is composed of several band chunks may be considered.

As an example of the framework, if the length of a terahertz pulse (THz pulse) for one carrier is set to 50 ps, the bandwidth (BW) becomes about 20 GHz. Assuming that each window corresponds to one chunk in FIG. 13B, each chunk may consist of 2 to 4 carriers.

Hereinafter, matters related to a phase error of an O/E converter are described in more detail.

Effective down conversion from IR band to THz band depends on how the nonlinearity of the O/E converter is utilized.

In other words, to down-convert to a desired terahertz band (THz band), it is required to design an O/E converter having the most ideal non-linearity to carry to the terahertz band (THz band). If an O/E converter that does not fit the target frequency band is used, there is a high chance of an error in the amplitude and phase of the corresponding pulse.

Matters related thereto are exemplified in FIGS. 14 and 15.

FIG. 14 illustrates an example terahertz pulse. Specifically, (a) of FIG. 14 illustrates a plurality of example terahertz pulses in periodically poled lithium niobate (PPLN), and (b) of FIG. 14 illustrates an example of generation of a terahertz wave (THz wave) through optical rectification in PPLN.

FIG. 15 illustrates the relationship between medium type and modulation in an O/E converter. Referring to (b) of FIG. 15, the target frequency varies according to the structure of the O/E converter.

In a single carrier system, a terahertz transmission/reception system may be implemented using one O/E converter. Although it depends on the channel environment, in a multi-carrier system, as many O/E converters as the number of carriers may be required. In particular, in the case of a multi-carrier system using several broad bands according to the above-described spectrum usage-related plans, the phenomenon will become conspicuous.

In this regard, a frame structure for the multi-carrier system may be considered and is illustrated in FIG. 16.

FIG. 16 illustrates an example frame structure for a terahertz multi-carrier system according to an embodiment of the disclosure. Referring to FIG. 16, a frequency down-converted signal based on an O/E converter may be transmitted in a specific resource region (e.g., a specific frame). The frequency domain of the specific resource region may include a plurality of chunks. Each chunk may be composed of at least one component carrier (CC).

In the specific resource region, 16a is a frequency gap between chunks. 16b is a frequency gap between component carriers (CC) considering phase noise. 16c is the component carrier (CC) and may range from several hundred MHz to several GHz.

According to an embodiment, one chunk may mean one contiguous band in which an error occurs due to a predetermined range of tolerance with respect to a down conversion operation of one O/E converter.

The structure of a transmitter related to the specific resource region is exemplified in FIG. 17.

FIG. 17 illustrates an example structure of a photonic source-based terahertz transmitter according to an embodiment of the disclosure. Specifically, FIG. 17 illustrates the structure of a photonic source-based THz transmitter for the one chunk.

Described below is a method for estimating phase noise and the structure of a terahertz multi-carrier transmitter to reduce the number of O/E converters. Further, the embodiments and/or methods described in the disclosure are differentiated solely for ease of description, and some components in any one method may be replaced, or combined with components of another method.

[Proposal 1]

A structure in which all component carriers (CC) or all chunks are bundled in a single O/E converter may be considered. Alternatively, a structure in which N contiguous or non-contiguous CCs or chunks are bundled into a single O/E converter may be considered. The RA ROYA R structure of the transmitter is illustrated in FIG. 18. Referring to FIG. 18, signals for two or more chunks may be input to one O/E converter.

[Proposal 1-1]

Application of DPSK may be considered for estimation of phase noise.

Specifically, considering the structure of the transmitter, differential phase shift keying (DPSK) may be applied according to at least one of i) and ii) below.

i) intra-CC or intra-chunk ii) inter-CC or inter-chunk

In other words, the frequency down-converted signal through the O/E converter may be transmitted in the specific resource region to which the DPSK is applied. FIG. 19 exemplifies the specific resource region.

According to the frame structure illustrated in FIG. 19, carriers 19c exist in each chunk, and the corresponding carrier may range from several hundred MHz to several GHz. A frequency gap 19b is included between the carriers to prevent loss due to phase noise. 19a is a frequency gap between chunks. 19d refers to the application of DPSK according to intra-chunk.

In the frame structure, the chunks may be contiguous or non-contiguous.

In the transmitter in which a plurality of chunks are bundled into a single O/E converter, the plurality of chunks except for a main chunk may suffer from an additional error due to an O/E converter mismatch. According to an embodiment, the main chunk may be a chunk including a target band of a corresponding converter when a single O/E converter is used.

Specifically, according to a down conversion operation of an O/E converter, a phase error due to the Kerr effect and phase noise due to the O/E converter mismatch both occur. The phase error due to the Kerr effect is related to self-phase modulation (SPM), cross-phase modulation (CPM), and/or four-wave mixing (FWM).

It is estimated that the number of CCs in the chunk is not large, and if a reference signal RS is transmitted for phase noise tracking, time tracking is required, so that the overhead required for reference signal signaling increases.

In contrast, if differential phase shift keying (DPSK) is applied to intra-chunk and/or inter-chunk, the overall phase error including the phase error of the channel may be estimated on the reception end. In other words, upon implementing a multi-carrier system, it is possible to reduce the number of O/E converters while simultaneously estimating frequency/time phase noise without a reference signal (RS).

In the frame structure, components related to one carrier in the chunk are configured in the order of an optical generator, an optical modulator, and an optical amplifier.

In the frame structure, self-phase modulation (SPM) in the main chunk and estimation of channel phase error are first performed, or self-phase modulation (SPM) in the main chunk and channel phase error may be disregarded.

When self-phase modulation (SPM), cross-phase modulation (CPM), and/or four-wave mixing (FWM) and channel phase error estimation in the main chunk are required, DPSK may be performed on the time axis. In this case, decoding for the main chunk should first be performed from the viewpoint of the UE.

If self-phase modulation (SPM), cross-phase modulation (CPM), and/or four-wave mixing (FWM) and channel phase error in the main chunk are disregarded, first decoding on the main chunk in terms of the UE is unnecessary.

Hereinafter, a configuration for application of DPSK between terahertz component carriers (THz CCs) (intra-chunk, inter-chunk) is described in detail.

[Proposal 2]

To enhance performance, a chunk including a component carrier (CC) having the highest signal to noise ratio may be considered as a main chunk.

Here, the main chunk may mean a chunk including a component carrier (CC) having the best link performance in relation to an O/E converter and an optical generator or a chunk with the best link performance.

In this regard, the base station may indicate a chunk index (main chunk index) and/or a component carrier index (CC index) through a higher layer.

Specifically, the base station may indicate the main chunk index and/or the main component carrier index (main CC index) in chunk units in relation to intra-chunk DPSK application in the chunk.

The base station may indicate the main chunk index and/or the main component carrier index (main CC index) in chunk group units in relation to inter-chunk DPSK application. The chunk group is a group of the plurality of chunks related to (bundled in) one O/E converter.

After performing decoding on the main chunk, the UE may perform data decoding and phase error estimation under the assumption that DPSK has been applied to the main chunk and the other chunk parts. The above-described operation has an effect of eliminating channel ambiguity in the main chunk, the main chunk group, or the main component carrier.

The base station may indicate the main chunk index, the main chunk group index, and/or the component carrier index (CC index) through MAC-CE or Li (DCI). In this case, the UE recognizes that the main chunk, the main chunk group, and/or the main component carrier (main CC) are changed, performs decoding on the updated main chunk (main chunk), main chunk group, and/or main component carrier (main CC), and then performs decoding under the assumption that DPSK is applied with the main chunk, main chunk group, and/or main component carrier (main CC), in the other chunks, chunk groups, and component carriers (CCs).

After the UE obtains main chunk and/or main component carrier (main CC) information, the UE may assume that DPSK has been applied with the other chunks, chunk groups, or component carriers (CCs) with respect to the main chunk or the main component carrier (main CC). The UE may perform DPSK decoding under the above-described assumption.

In another method, the UE compares the received main chunk and/or main component carrier (main CC) information with the main chunk and/or main component carrier (main CC) measured by the UE. If the result of comparison reveals that they differ, the UE may feed it back to the base station. In this case, the UE may transmit a scheduling request (SR) for the feedback via an uplink (UL) control channel or may feed, back to the base station, the main chunk measured by the UE, main chunk group index, and/or main component carrier index (main CC index).

After receiving the scheduling request (SR), the base station may transmit information for the modified main chunk, the modified main chunk group, and/or the modified main component carrier (modified main CC) to the UE (via DCI, MAC-CE).

Hereinafter, a configuration related to the order of application of DPSK is described in detail.

[Proposal 3]

An index related to order of DPSK on preceding and following data (e.g., $n_k(t)-T$ or $n_k(t)-n_{k-1}(t-T)$) may be transmitted through an RRC, MAC-CE or DCI. Here, T is the symbol duration.

According to an embodiment, for the index for the order of DPSK on preceding data and following data order is 0, when Q=0, $n_k(t)-n_k(t-T)$, when Q=1, $n_k(t)-n_{k-1}(t-T)$, when Q=2, $n_k(t+T)-n_k(t)$, and when Q=3, $n_{k+1}(t)-n_k(t)$.

According to an embodiment, in the case of QDPSK, the order index may include I-channel (In-phase, real)/Q-channel (quadrature, imaginary) information. When Q=0, $n_{k,i}(t)-n_{k,i}(t-T)$ (where, k and i mean in-phase data for k CCs), when Q=1, $n_{k,q}(t)-n_{k,q}(t-T)$ (where, k and q mean quadrature data for k CCs, when Q=2, $n_{k,i}(t)-n_{k,q}(t-T)$ as the preceding/following data for I/Q, or when Q=3, $n_{k,q}(t)-n_{k,i}(t-T)$ When Q=4, this may mean $n_{k,i}(t)-n_{k-1,i}(t-T)$.

An index related to interval information a between the preceding and following data for DPSK (e.g., $n_k(t)-n_k(t-a*T)$ or $n_k(t)-n_{k-a}(t)$) may be transmitted via an RRC, MAC-CE or DCI.

For example, if a=1, an index P=0 may be transmitted from the base station to the UE, and if a=2, an index P=1 may be transmitted from the base station to the UE.

The order of application of DPSK is described below in detail with reference to FIG. 20.

FIG. 20 is a view illustrating a specific scheme of differential phase shift keying (DPSK) according to an embodiment of the disclosure.

Referring to (a) of FIG. 20, an order for DPSK in chunk K may start from the frequency axis and proceed to the time axis. Referring to (b) of FIG. 20, the order for the DPSK may start from the time axis and proceed to the frequency axis. However, in the DPSK of the last component carrier (CC), data corresponding to the closest component carrier (CC) becomes the following data.

In terms of implementation, the operations of the base station/UE (e.g., operations related to transmission/reception of signals based on an O/E converter) according to the above-described embodiments may be processed by the devices (e.g., the processor 102 or 202 of FIG. 26) of FIGS. 25 to 29 described below.

Further, the operations of the base station/UE according to the above-described embodiments (e.g., operations related to signal transmission/reception based on an O/E converter) may be stored in a memory (e.g., 104 or 204 of FIG. 26), in the form of instructions/program (e.g., instructions or executable code) for driving at least one processor (e.g., 102 or 202 of FIG. 11).

The above-described embodiments are described below in detail with reference to FIGS. 21 and 22 in terms of the operation of the UE.

Further, the embodiments and/or methods described in the disclosure are differentiated solely for ease of description, and some components in any one method may be replaced, or combined with components of another method.

FIG. 21 is a flowchart illustrating a method for receiving a signal by a UE in a wireless communication system according to an embodiment of the disclosure.

Referring to FIG. 21, a method for a UE to receive a signal in a wireless communication system according to an embodiment of the disclosure includes receiving a configuration related to a frequency down-converted signal (S2110) and receiving the signal in a specific resource region (S2120).

In S2110, the UE receives, from a base station, a configuration related to a signal down-converted in frequency based on an optical-to-electrical (O/E) converter.

The frequency down-converted signal may be a down-converted signal from an infrared band to a terahertz band by an optical-to-electric converter.

The configuration may include at least one of information related to a resource region in which the signal is transmitted or information related to application of differential phase shift keying (DPSK), which is described below.

According to an embodiment, the configuration may include information related to at least one of an order or an interval related to application of DPSK.

According to an embodiment, the configuration may include information related to a section to which the DPSK is applied in the specific resource region. The configuration may include information indicating whether the DPSK is applied in relation to the signal transmission, and the information may be information indicating on/off of the DPSK or enabling/disabling of the DPSK.

The order may mean an order between preceding data and following data in relation to application of the DPSK. Alternatively, the order may mean an order in which DPSK is applied within the chunk. In this case, according to the order, the DPSK may start from the time axis and proceed to the frequency axis or may start from the frequency axis and proceed to the time axis.

According to S2110 as described above, the operation in which the UE (100/200 of FIGS. 25 to 29) receives, from the base station (100/200 of FIGS. 25 to 29), a configuration related to a frequency down-converted signal based on an O/E converter may be implemented by the device of FIGS. 25 to 29. For example, referring to FIG. 26, one or more processors 102 may control one or more transceivers 106 and/or one or more memories 104 to receive, from the base station 200, the configuration related to the frequency down-converted signal based on the O/E converter.

In S2120, the UE receives, from the base station, the signal in a specific resource region based on the configuration.

According to an embodiment, a frequency domain of the specific resource region may include a plurality of chunks, and the chunk may be composed of at least one component carrier (CC).

According to an embodiment, the configuration may include information representing a main chunk related to differential phase shift keying (DPSK).

According to an embodiment, transmission of the signal may be based on the DPSK applied between chunks in the frequency domain with respect to the main chunk.

According to an embodiment, the main chunk may include a target frequency band of the O/E converter. The main chunk may include a component carrier (CC) having a highest signal-to-noise ratio (SNR).

According to an embodiment, the reception of the signal may be based on decoding performed in the specific resource region. The decoding may be performed from the main chunk. In other words, the UE may perform decoding on the remaining chunks after decoding the main chunk. In this case, the UE may perform decoding under the assumption that DPSK is applied between the main chunk and the other chunks.

According to an embodiment, the DPSK may be applied between component carriers (CCs) belonging to respective ones of the plurality of chunks.

According to an embodiment, the frequency domain may include a frequency gap positioned at each specific interval. The specific interval may include at least one of the chunk or the component carrier. The frequency gap is intended for preventing loss due to phase noise.

According to S2120 as described above, the operation in which the UE (100/200 of FIGS. 25 to 29) receives, from the base station (100/200 of FIGS. 25 to 29), the signal in the specific resource region based on the configuration may be implemented by the device of FIGS. 25 to 29. For example, referring to FIG. 26, one or more processors 102 may control one or more transceivers 106 and/or one or more memories 104 to receive, from the base station 200, the signal in the specific resource region based on the configuration.

The UE may perform feedback related to the main chunk, which is described below in detail with reference to FIG. 22.

FIG. 22 is a flowchart illustrating a method for receiving a signal by a UE in a wireless communication system according to another embodiment of the disclosure.

Referring to FIG. 22, according to another embodiment of the disclosure, a method for receiving a signal by a UE in a wireless communication system includes receiving a configuration related to a frequency down-converted signal (S2210), transmitting control information related to a main chunk (S2220), receiving downlink control information related to updating the main chunk (S2230), and receiving the signal in a specific resource region (S2240). Since S2210 and S2240 are the same as S2110 and S2120 described above, no duplicate description thereof is given.

In S2210, the UE receives, from a base station, a configuration related to a signal down-converted in frequency based on an optical-to-electrical (O/E) converter.

According to S2210 as described above, the operation in which the UE (100/200 of FIGS. 25 to 29) receives, from the base station (100/200 of FIGS. 25 to 29), a configuration related to a frequency down-converted signal based on an O/E converter may be implemented by the device of FIGS. 25 to 29. For example, referring to FIG. 26, one or more processors 102 may control one or more transceivers 106 and/or one or more memories 104 to receive, from the base station 200, the configuration related to the frequency down-converted signal based on the O/E converter.

In S2220, the UE transmits control information related to the main chunk to the base station.

According to an embodiment, the control information may be transmitted based on the component carrier (CC) having the highest SNR belonging to a chunk, other than the main chunk, among the plurality of chunks. In other words, when the main chunk measured by the UE is different from the main chunk indicated through the configuration, the UE may transmit the control information.

The control information may be a scheduling request (SR) transmitted via a physical uplink control channel (PUCCH).

According to S2220 described above, the operation in which the UE (100/200 of FIGS. 25 to 29) transmits the main chunk-related control information to the base station (100/200 of FIGS. 25 to 29) may be implemented by the device of FIGS. 25 to 29. For example, referring to FIG. 26, one or more processors 102 may control one or more transceivers 106 and/or one or more memories 104 to transmit the main chunk-related control information to the base station 200.

In S2230, the UE receives, from the base station, downlink control information (DCI) related to updating the main chunk. The downlink control information (DCI) may include information representing the updated main chunk.

According to an embodiment, the DPSK may be applied with respect to the updated main chunk. The UE may perform the decoding with respect to the updated main chunk.

According to S2230 described above, the operation in which the UE (100/200 of FIGS. 25 to 29) receives, from the base station (100/200 of FIGS. 25 to 29), the downlink control information (DCI) related to updating the main chunk may be implemented by the device of FIGS. 25 to 29. For example, referring to FIG. 26, one or more processors 102 may control one or more transceivers 106 and/or one or more memories 104 to receive, from the base station 200, the downlink control information (DCI) related to updating the main chunk.

In S2240, the UE receives, from the base station, the signal in a specific resource region based on the configuration.

According to an embodiment, transmission of the signal may be based on the DPSK applied between chunks in the frequency domain with respect to the main chunk. The DPSK may be applied with respect to the main chunk updated by the downlink control information.

According to S2240 as described above, the operation in which the UE (100/200 of FIGS. 25 to 29) receives, from the base station (100/200 of FIGS. 25 to 29), the signal in the specific resource region based on the configuration may be implemented by the device of FIGS. 25 to 29. For example, referring to FIG. 26, one or more processors 102 may control one or more transceivers 106 and/or one or more memories 104 to receive, from the base station 200, the signal in the specific resource region based on the configuration.

The above-described embodiments are described below in detail with reference to FIGS. 23 and 24 in terms of the operation of the base station.

Further, the embodiments and/or methods described in the disclosure are differentiated solely for ease of description, and some components in any one method may be replaced, or combined with components of another method.

FIG. 23 is a flowchart illustrating a method for transmitting a signal by a base station in a wireless communication system according to an embodiment of the disclosure.

Referring to FIG. 23, a method for a base station to transmit a signal in a wireless communication system according to an embodiment of the disclosure includes transmitting a configuration related to a frequency down-converted signal (S2310) and transmitting the signal in a specific resource region (S2320).

In S2310, the base station transmits, to a UE, a configuration related to a signal down-converted in frequency based on an optical-to-electrical (O/E) converter.

The frequency down-converted signal may be a down-converted signal from an infrared band to a terahertz band by an optical-to-electric converter.

The configuration may include at least one of information related to a resource region in which the signal is transmitted or information related to application of differential phase shift keying (DPSK), which is described below.

According to an embodiment, the configuration may include information related to at least one of an order or an interval related to application of DPSK.

According to an embodiment, the configuration may include information related to a section to which the DPSK is applied in the specific resource region. The configuration may include information indicating whether the DPSK is applied in relation to the signal transmission, and the information may be information indicating on/off of the DPSK or enabling/disabling of the DPSK.

The order may mean an order between preceding data and following data in relation to application of the DPSK. Alternatively, the order may mean an order in which DPSK is applied within the chunk. In this case, according to the order, the DPSK may start from the time axis and proceed to the frequency axis or may start from the frequency axis and proceed to the time axis.

According to S2310 as described above, the operation in which the base station (100/200 of FIGS. 25 to 29) transmits, to the UE (100/200 of FIGS. 25 to 29), a configuration related to a frequency down-converted signal based on an O/E converter may be implemented by the device of FIGS. 25 to 29. For example, referring to FIG. 26, one or more processors 202 may control one or more transceivers 206 and/or one or more memories 204 to transmit, to the UE 100, the configuration related to the frequency down-converted signal based on the O/E converter.

In S2320, the base station transmits, to the UE, the signal in a specific resource region based on the configuration.

According to an embodiment, a frequency domain of the specific resource region may include a plurality of chunks, and the chunk may be composed of at least one component carrier (CC).

According to an embodiment, the configuration may include information representing a main chunk related to differential phase shift keying (DPSK).

According to an embodiment, transmission of the signal may be based on the DPSK applied between chunks in the frequency domain with respect to the main chunk.

According to an embodiment, the main chunk may include a target frequency band of the O/E converter. The main chunk may include a component carrier (CC) having a highest signal-to-noise ratio (SNR).

According to an embodiment, the DPSK may be applied between component carriers (CCs) belonging to respective ones of the plurality of chunks.

According to an embodiment, the frequency domain may include a frequency gap positioned at each specific interval. The specific interval may include at least one of the chunk or the component carrier. The frequency gap is intended for preventing loss due to phase noise.

According to S2320 as described above, the operation in which the base station (100/200 of FIGS. 25 to 29) transmits, to the UE (100/200 of FIGS. 25 to 29), the signal in the specific resource region based on the configuration may be implemented by the device of FIGS. 25 to 29. For example, referring to FIG. 26, one or more processors 202 may control one or more transceivers 206 and/or one or more memories 204 to transmit, to the UE 100, the signal in the specific resource region based on the configuration.

The base station may receive feedback related to the main chunk, which is described below in detail with reference to FIG. 24.

FIG. 24 is a flowchart illustrating a method for transmitting a signal by a base station in a wireless communication system according to another embodiment of the disclosure.

Referring to FIG. 24, according to another embodiment of the disclosure, a method for transmitting a signal by a base station in a wireless communication system includes transmitting a configuration related to a frequency down-converted signal (S2410), receiving control information related to a main chunk (S2420), transmitting downlink control information related to updating the main chunk (S2430), and transmitting the signal in a specific resource region (S2440). Since S2410 and S2440 are the same as S2310 and S2320 described above, no duplicate description thereof is given.

In S2410, the base station transmits, to a UE, a configuration related to a signal down-converted in frequency based on an optical-to-electrical (O/E) converter.

According to S2410 as described above, the operation in which the base station (100/200 of FIGS. 25 to 29) transmits, to the UE (100/200 of FIGS. 25 to 29), a configuration related to a frequency down-converted signal based on an O/E converter may be implemented by the device of FIGS. 25 to 29. For example, referring to FIG. 26, one or more processors 202 may control one or more transceivers 206 and/or one or more memories 204 to transmit, to the UE 100, the configuration related to the frequency down-converted signal based on the O/E converter.

In S2420, the base station receives the main chunk-related control information from the UE.

According to an embodiment, the control information may be transmitted based on the component carrier (CC) having the highest SNR belonging to a chunk, other than the main chunk, among the plurality of chunks. In other words, when the main chunk measured by the UE is different from the main chunk indicated through the configuration, the base station may receive the control information.

The control information may be a scheduling request (SR) transmitted via a physical uplink control channel (PUCCH).

According to S2420 described above, the operation in which the base station (100/200 of FIGS. 25 to 29) receives the main chunk-related control information from the UE (100/200 of FIGS. 25 to 29) may be implemented by the device of FIGS. 25 to 29. For example, referring to FIG. 26, one or more processors 202 may control one or more transceivers 206 and/or one or more memories 204 to receive the main chunk-related control information from the UE 100.

In S2430, the base station transmits, to the UE, downlink control information (DCI) related to updating the main chunk. The downlink control information (DCI) may include information representing the updated main chunk.

According to an embodiment, the DPSK may be applied with respect to the updated main chunk.

According to S2430 described above, the operation in which the base station (100/200 of FIGS. 25 to 29) transmits, to the UE (100/200 of FIGS. 25 to 29), the downlink control information (DCI) related to updating the main chunk may be implemented by the device of FIGS. 25 to 29. For example, referring to FIG. 26, one or more processors 202 may control one or more transceivers 206 and/or one or more memories 204 to transmit, to the UE 100, the downlink control information (DCI) related to updating the main chunk.

In S2440, the base station transmits, to the UE, the signal in a specific resource region based on the configuration.

According to an embodiment, transmission of the signal may be based on the DPSK applied between chunks in the frequency domain with respect to the main chunk. The DPSK may be applied with respect to the main chunk updated by the downlink control information.

According to S2440 as described above, the operation in which the base station (100/200 of FIGS. 25 to 29) transmits, to the UE (100/200 of FIGS. 25 to 29), the signal in the specific resource region based on the configuration may be implemented by the device of FIGS. 25 to 29. For example, referring to FIG. 26, one or more processors 202 may control one or more transceivers 206 and/or one or more memories 204 to transmit, to the UE 100, the signal in the specific resource region based on the configuration.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 25 illustrates a communication system 1 applied to the disclosure.

Referring to FIG. 25, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure

FIG. 26 illustrates wireless devices applicable to the disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 2006} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 27 illustrates a signal process circuit for a transmission signal.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 28 illustrates another example of a wireless device applied to the disclosure.

The wireless device may be implemented in various forms according to a use-case/service (refer to FIG. 25). Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 29 illustrates a hand-held device applied to the disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

The signal transmission/reception method and device in a wireless communication system according to embodiments of the disclosure provide the following effects.

According to an embodiment of the disclosure, a frequency down-converted signal based on an O/E converter is transmitted in a specific resource region. A frequency domain of the specific resource region includes a plurality of chunks, and wherein the chunk is composed of at least one component carrier (CC). Accordingly, the number of O/E converters required for signal transmission in the multi-carrier system is reduced, thereby reducing implementation complexity.

Also, according to an embodiment of the disclosure, the transmission of a signal is based on differential phase shift keying (DPSK) applied between chunks in the frequency domain with respect to a main chunk. Therefore, even when the multi-carrier system does not include as many O/E converters as the total number of carriers, decoding may be easily performed based on the DPSK, thereby minimizing communication quality degradation due to a phase error.

The embodiments of the disclosure described above are combinations of elements and features of the disclosure. The elements or features may be considered selective unless otherwise mentioned. Each element or feature may be practiced without being combined with other elements or features. Further, an embodiment of the disclosure may be constructed by combining parts of the elements and/or features. Operation orders described in embodiments of the disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the disclosure or included as a new claim by subsequent amendment after the application is filed.

The embodiments of the disclosure may be achieved by various means, for example, hardware, firmware, software, or a combination thereof. In a hardware configuration, the methods according to the embodiments of the disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for receiving a signal by a user equipment (UE) in a wireless communication system, the method comprising:
　receiving a configuration which is related to a resource region in which the signal is transmitted; and
　receiving the signal in the resource region based on the configuration,
　wherein a time domain resource of the resource region includes at least one symbol,
　wherein the at least one symbol belongs to at least one slot,
　wherein the at least one slot is based on at least one of one or more slots within a subframe,
　wherein the subframe is one of a number of subframes within a radio frame,
　wherein a number of the one or more slots within the subframe is determined based on an Orthogonal Frequency Division Multiplexing (OFDM) numerology related to the at least one symbol,
　wherein the signal is based on a signal down-converted in frequency based on an optical-to-electrical (O/E) converter,
　wherein a frequency domain resource of the resource region includes a plurality of chunks, and each chunk is composed of at least one component carrier (CC), wherein the configuration includes information representing a main chunk related to differential phase shift keying (DPSK),
wherein transmission of the signal is based on the DPSK applied between the plurality of chunks based on the main chunk,
wherein the main chunk includes a target frequency band of the O/E converter and the reception of the signal is based on decoding performed from the main chunk.

2. The method of claim 1, wherein the configuration includes information for an order related to application of the DPSK.

3. The method of claim 2, wherein
the DPSK is applied between component carriers (CCs) belonging to respective ones of the plurality of chunks.

4. The method of claim 1, wherein the main chunk includes a component carrier (CC) having a highest signal-to-noise ratio (SNR).

5. The method of claim 4, further comprising:
transmitting control information related to the main chunk, wherein the control information is transmitted based on the component carrier (CC) having the highest SNR belonging to a chunk, other than the main chunk, among the plurality of chunks.

6. The method of claim 5, further comprising receiving downlink control information related to updating the main chunk.

7. The method of claim 6, wherein the DPSK is applied with respect to the updated main chunk.

8. A UE receiving a signal in a wireless communication system, the UE comprising:
one or more transceivers;
one or more processors; and
one or more memories operably connectable to the one or more processors and storing instructions, based on being executed by the one or more processors, which configure the one or more processor to perform operations comprising:
receiving a configuration which is related to a resource region in which the signal is transmitted; and
receiving the signal in the resource region based on the configuration,
wherein a time domain resource of the resource region includes at least one symbol,
wherein the at least one symbol belongs to at least one slot,
wherein the at least one slot is based on at least one of one or more slots within a subframe,
wherein the subframe is one of a number of subframes within a radio frame,
wherein a number of the one or more slots within the subframe is determined based on an Orthogonal Frequency Division Multiplexing (OFDM) numerology related to the at least one symbol,
wherein the signal is based on a signal down-converted in frequency based on an optical-to-electrical (O/E) converter,
wherein a frequency domain resource of the resource region includes a plurality of chunks, and each chunk is composed of at least one component carrier (CC), wherein
the configuration includes information representing a main chunk related to differential phase shift keying (DPSK),
wherein transmission of the signal is based on the DPSK applied between the plurality of chunks based on the main chunk,
wherein the main chunk includes a target frequency band of the O/E converter and the reception of the signal is based on decoding performed from the main chunk.

9. A method for transmitting a signal by a base station in a wireless communication system, the method comprising:
transmitting a configuration which is related to a resource region in which the signal is transmitted; and
transmitting the signal in the resource region based on the configuration,
wherein a time domain resource of the resource region includes at least one symbol,
wherein the at least one symbol belongs to at least one slot,
wherein the at least one slot is based on at least one of one or more slots within a subframe,
wherein the subframe is one of a number of subframes within a radio frame,
wherein a number of the one or more slots within the subframe is determined based on an Orthogonal Frequency Division Multiplexing (OFDM) numerology related to the at least one symbol,
wherein the signal is based on a signal down-converted in frequency based on an optical-to-electrical (O/E) converter,
wherein a frequency domain resource of the resource region includes a plurality of chunks, and each chunk is composed of at least one component carrier (CC),
wherein the configuration includes information representing a main chunk related to differential phase shift keying (DPSK),
wherein transmission of the signal is based on the DPSK applied between the plurality of chunks based on the main chunk,
wherein the main chunk includes a target frequency band of the O/E converter and the reception of the signal by the UE is based on decoding performed from the main chunk.

10. The method of claim 9, wherein the configuration includes information for an order related to application of the DPS K.

11. The method of claim 10, wherein the DPSK is applied between component carriers (CCs) belonging to respective ones of the plurality of chunks.

12. The method of claim 9, wherein the main chunk includes a component carrier (CC) having a highest signal-to-noise ratio (SNR).

13. The method of claim 12, further comprising:
receiving control information related to the main chunk, wherein the control information is transmitted based on the component carrier (CC) having the highest SNR belonging to a chunk, other than the main chunk, among the plurality of chunks.

14. The method of claim 13, further comprising transmitting downlink control information related to updating the main chunk.

* * * * *